US010286682B2

(12) United States Patent
Barndt et al.

(10) Patent No.: US 10,286,682 B2
(45) Date of Patent: *May 14, 2019

(54) PRINTING USING COLOR CHANGEABLE MATERIAL

(71) Applicant: Quad/Graphics, Inc., Sussex, WI (US)

(72) Inventors: John Barndt, Oconomowoc, WI (US); Robert H. Barton, Jr., Waukesha, WI (US); Terrill S. Clayton, Elm Grove, WI (US); Monte J. Rose, Hartland, WI (US); Paul G. Volz, Hubertus, WI (US)

(73) Assignee: QUAD/GRAPHICS, INC., Sussex, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/282,928

(22) Filed: Sep. 30, 2016

(65) Prior Publication Data
US 2017/0021638 A1 Jan. 26, 2017

Related U.S. Application Data

(63) Continuation of application No. 14/724,587, filed on May 28, 2015, now Pat. No. 9,460,373, which is a
(Continued)

(51) Int. Cl.
*H04N 1/40* (2006.01)
*B41J 2/45* (2006.01)
(Continued)

(52) U.S. Cl.
CPC .............. *B41J 2/45* (2013.01); *B41J 2/4753* (2013.01); *B41J 2/525* (2013.01); *B41J 3/50* (2013.01);
(Continued)

(58) Field of Classification Search
CPC ... B41J 2/485; B41J 2/435; B41J 2/525; B41J 2/00; B41J 2/315; B41J 2/385;
(Continued)

(56) References Cited

U.S. PATENT DOCUMENTS 4,161,141 A   7/1979   Lakhani
4,165,686 A   8/1979   Borelli et al.
(Continued)

FOREIGN PATENT DOCUMENTS

DE   10 2005 029 971   1/2007
EP         0 618 141    10/1994
(Continued)

OTHER PUBLICATIONS

European Search Report for Application No. 08871555.2, dated Mar. 23, 2012, 6 pages.
(Continued)

*Primary Examiner* — Dwayne D Bost
*Assistant Examiner* — Stephen M Brinich
(74) *Attorney, Agent, or Firm* — Foley & Lardner LLP

(57) ABSTRACT

Systems and methods for printing data on a substrate including a color-changeable material are provided. One system includes a processing circuit and a device including an energy source. At least a portion of a printed publication is printed on the substrate using a commercial printing press based on fixed data. The device including the energy source is configured to add variable data to the substrate. The processing circuit is configured to receive the variable data and to control the energy source to change a color of the color-changeable material based on the variable data to provide at least a portion of the printed publication. The processing circuit is configured to control the energy source to change the color of the color-changeable material in-line with a flow of the substrate through one of a printing line,
(Continued)

a finishing line, or a packaging line of the commercial printing press.

20 Claims, 16 Drawing Sheets

Related U.S. Application Data continuation of application No. 14/098,356, filed on Dec. 5, 2013, now Pat. No. 9,070,075, which is a continuation of application No. 12/864,490, filed as application No. PCT/US2008/084133 on Nov. 20, 2008, now Pat. No. 8,605,322.

(60) Provisional application No. 61/062,213, filed on Jan. 24, 2008.

(51) Int. Cl.
*B41J 3/50* (2006.01)
*B41J 2/475* (2006.01)
*G06K 15/02* (2006.01)
*H04N 1/60* (2006.01)
*B41J 2/525* (2006.01)
*G06K 15/12* (2006.01)
*B41M 5/26* (2006.01)

(52) U.S. Cl.
CPC ............ *B41M 5/26* (2013.01); *G06K 15/129* (2013.01); *G06K 15/1247* (2013.01); *G06K 15/188* (2013.01); *G06K 15/1878* (2013.01); *H04N 1/6027* (2013.01); *G03G 2215/00523* (2013.01); *G06K 2215/0094* (2013.01)

(58) Field of Classification Search
CPC ...... G06K 15/00; G06K 15/002; G06K 15/02; G06K 15/22; H04N 1/23; H04N 1/024; H04N 1/04
USPC .......... 358/1.9, 2.1, 1.18, 1.15, 1.7–1.8, 1.3, 358/496–498, 500, 486, 488; 347/232–242, 251–255, 224–225, 347/132–135, 115–117
See application file for complete search history.

(56) References Cited

U.S. PATENT DOCUMENTS

| | | |
|---|---|---|
| 4,178,847 A | 12/1979 | Erhardt |
| 4,580,144 A | 4/1986 | Calvi |
| 4,861,620 A | 8/1989 | Azuma et al. |
| 4,958,233 A | 9/1990 | Okino |
| 4,978,974 A | 12/1990 | Etzel |
| 5,104,767 A | 4/1992 | Nakamura |
| 5,136,316 A | 8/1992 | Punater et al. |
| 5,166,703 A | 11/1992 | Watanabe et al. |
| 5,262,470 A | 11/1993 | Shimotsuma et al. |
| 5,287,128 A | 2/1994 | Doane et al. |
| 5,329,300 A | 7/1994 | Nishiyama |
| 5,340,628 A | 8/1994 | McKillip |
| 5,561,604 A | 10/1996 | Buckley et al. |
| 5,576,377 A | 11/1996 | El Sayed et al. |
| 5,625,402 A | 4/1997 | Sarraf |
| 5,633,118 A | 5/1997 | Burberry et al. |
| 5,633,119 A | 5/1997 | Burberry et al. |
| 5,645,920 A | 7/1997 | Nishiyama |
| 5,703,709 A | 12/1997 | Mori et al. |
| 5,769,457 A | 6/1998 | Warther |
| 5,855,969 A | 1/1999 | Robertson |
| 6,039,356 A | 3/2000 | Warther et al. |
| 6,058,384 A | 5/2000 | Pierce et al. |
| 6,077,810 A | 6/2000 | Imaeda |
| 6,078,713 A | 6/2000 | Tausch et al. |
| 6,107,010 A | 8/2000 | Corniglion et al. |
| 6,125,760 A | 10/2000 | Graushar et al. |
| 6,133,342 A | 10/2000 | Mizobuchi et al. |
| 6,133,345 A | 10/2000 | Pakusch et al. |
| 6,139,914 A | 10/2000 | Suzuki et al. |
| 6,161,971 A | 12/2000 | Suzuki et al. |
| 6,167,326 A | 12/2000 | Graushar et al. |
| 6,207,240 B1 | 3/2001 | Schoenfeld et al. |
| 6,243,161 B1 | 6/2001 | Suzuki et al. |
| 6,267,366 B1 | 7/2001 | Graushar et al. |
| 6,269,609 B2 | 8/2001 | Graushar et al. |
| 6,302,388 B1 | 10/2001 | Graushar et al. |
| 6,305,716 B1 | 10/2001 | Warther et al. |
| 6,358,587 B1 | 3/2002 | Saint et al. |
| 6,372,819 B1 | 4/2002 | Mizobuchi et al. |
| 6,381,028 B1 | 4/2002 | Gauthier |
| 6,429,889 B1 | 8/2002 | Murokh |
| 6,436,600 B1 | 8/2002 | Suzuki et al. |
| 6,478,861 B1 | 11/2002 | Kwan et al. |
| 6,486,905 B2 | 11/2002 | Suzuki et al. |
| 6,548,222 B2 | 4/2003 | Teng |
| 6,566,039 B1 | 5/2003 | Teng |
| 6,614,023 B2 | 9/2003 | Focke et al. |
| 6,670,981 B1 | 12/2003 | Vincent et al. |
| 6,675,062 B2 | 1/2004 | Graushar et al. |
| 6,692,895 B2 | 2/2004 | Huang et al. |
| 6,745,693 B2 | 6/2004 | Teng |
| 6,771,387 B2 | 8/2004 | Gauthier |
| 6,791,592 B2 | 9/2004 | Assa et al. |
| 6,829,000 B2 | 12/2004 | Assa et al. |
| 6,888,095 B2 | 5/2005 | Khan |
| 6,935,748 B2 | 8/2005 | Kaufman et al. |
| 6,936,358 B2 | 8/2005 | Kume et al. |
| 7,021,549 B2 | 4/2006 | O'Rell et al. |
| 7,047,883 B2 | 5/2006 | Raksha et al. |
| 7,089,420 B1 | 8/2006 | Durst et al. |
| 7,089,856 B2 | 8/2006 | Teng |
| 7,096,088 B2 | 8/2006 | Graushar et al. |
| 7,106,469 B2 | 9/2006 | Simpson et al. |
| 7,146,909 B2 | 12/2006 | Oohashi et al. |
| 7,162,035 B1 | 1/2007 | Durst et al. |
| 7,167,194 B2 | 1/2007 | Assa et al. |
| 7,168,472 B2 | 1/2007 | Hirst et al. |
| 7,187,396 B2 | 3/2007 | Carroll et al. |
| 7,220,479 B2 | 5/2007 | Lutz et al. |
| 7,264,916 B2 | 9/2007 | Heneghan et al. |
| 7,268,795 B2 | 9/2007 | Taugher et al. |
| 7,270,919 B2 | 9/2007 | Stubbs |
| 7,270,929 B2 | 9/2007 | Kwasny et al. |
| 7,311,954 B2 | 12/2007 | Koops et al. |
| 7,485,403 B2 | 2/2009 | Khan |
| 8,764,323 B2 | 7/2014 | Keeton |
| 9,460,373 B2 * | 10/2016 | Barndt ............ B41J 3/50 |
| 2002/0177065 A1 | 11/2002 | Sahi |
| 2004/0043171 A1 | 3/2004 | Audett |
| 2004/0173958 A1 | 9/2004 | Graushar |
| 2004/0218995 A1 | 11/2004 | Graushar |
| 2005/0032957 A1 | 2/2005 | Khan et al. |
| 2005/0035590 A1 | 2/2005 | Jones et al. |
| 2005/0077670 A1 | 4/2005 | Graushar et al. |
| 2005/0097866 A1 | 5/2005 | Hudetz |
| 2005/0099657 A1 | 5/2005 | Hudetz |
| 2005/0102057 A1 | 5/2005 | Graushar et al. |
| 2005/0118537 A1 | 6/2005 | Lutz et al. |
| 2005/0136229 A1 | 6/2005 | Baldwin et al. |
| 2005/0160362 A1 | 7/2005 | Obradovic et al. |
| 2005/0170282 A1 | 8/2005 | Inno et al. |
| 2005/0186511 A1 | 8/2005 | Khan |
| 2005/0212828 A1 | 9/2005 | Kunschke |
| 2005/0231585 A1 | 10/2005 | Mudigonda et al. |
| 2005/0233251 A1 | 10/2005 | Kakino et al. |
| 2005/0255406 A1 | 11/2005 | Assa |
| 2005/0269304 A1 | 12/2005 | Khan et al. |
| 2005/0271981 A1 | 12/2005 | Oohashi et al. |
| 2006/0055975 A1 | 3/2006 | Toda |
| 2006/0071407 A1 | 4/2006 | Graushar et al. |
| 2006/0141391 A1 | 6/2006 | Klein et al. |
| 2006/0147842 A1 | 7/2006 | Khan |
| 2006/0190125 A1 | 8/2006 | Stemmle |

(56) References Cited

U.S. PATENT DOCUMENTS

| | | |
|---|---|---|
| 2006/0196936 A1 | 9/2006 | Christofferson et al. |
| 2006/0228515 A1 | 10/2006 | Kwasny et al. |
| 2006/0259182 A1 | 11/2006 | Mantell |
| 2007/0068630 A1 | 3/2007 | Griffin et al. |
| 2007/0092836 A1 | 4/2007 | Inno et al. |
| 2007/0095232 A1 | 5/2007 | Teng |
| 2007/0100492 A1 | 5/2007 | Idaka et al. |
| 2007/0152067 A1 | 7/2007 | Bi et al. |
| 2007/0252006 A1 | 11/2007 | Heck et al. |
| 2007/0254241 A1 | 11/2007 | Teng |
| 2007/0281027 A1 | 12/2007 | Audett |
| 2008/0026319 A1 | 1/2008 | Stroh et al. |
| 2008/0311311 A1 | 12/2008 | Khan et al. |
| 2010/0075848 A1 | 3/2010 | Khan et al. |

FOREIGN PATENT DOCUMENTS

| | | |
|---|---|---|
| EP | 1 104 699 A1 | 6/2001 |
| EP | 1 657 072 A2 | 5/2006 |
| EP | 1 368 200 B1 | 12/2006 |
| GB | 2 300 779 A | 11/1996 |
| JP | 08-067068 | 3/1996 |
| JP | 2003-295399 | 10/2003 |
| WO | WO-2005/012442 A1 | 2/2005 |
| WO | WO-2005/068207 A1 | 7/2005 |
| WO | WO-2006/018640 A1 | 2/2006 |
| WO | WO-2006/051309 A1 | 5/2006 |
| WO | WO-2006/114600 A1 | 11/2006 |
| WO | WO-2007/063332 A2 | 6/2007 |
| WO | WO-2008/013420 A1 | 1/2008 |

OTHER PUBLICATIONS

Examination report for European Application No. 08871555.2, dated Apr. 19, 2013, 4 pages.
Extended European Search Report for European Application No. 15160266.1, dated Oct. 15, 2015, 6 pages.
Notice of Allowance for U.S. Appl. No. 14/098,356 dated Jan. 28, 2015, 7 pages.
Final Office Action for U.S. Appl. No. 14/098,356, dated Aug. 14, 2014, 15 pages.
Non-Final Office Action for U.S. Appl. No. 12/864,490, dated Dec. 13, 2012, 7 pages.
Preliminary Report on Patentability and Written Opinion for International Application No. PCT/US2008/084133, dated May 29, 2009, 6 pages.
Notice of Allowance for U.S. Appl. No. 12/864,490 dated Aug. 4, 2013. 8 pages.
Notice of Allowance for U.S. Appl. No. 14/724,587 dated Dec. 18, 2015. 5 pages.
Notice of Allowance for U.S. Appl. No. 14/724,587 dated Jun. 6, 2016. 7 pages.
Examination Report for EP 08871555.2 dated Apr. 3, 2014, 4 pages.
Examination Report for EP 15160266.1 dated Jan. 4, 2018, 3 pages.
Examination Report for EP 15160266.1 dated Nov. 9, 2018. 4 pages.

* cited by examiner

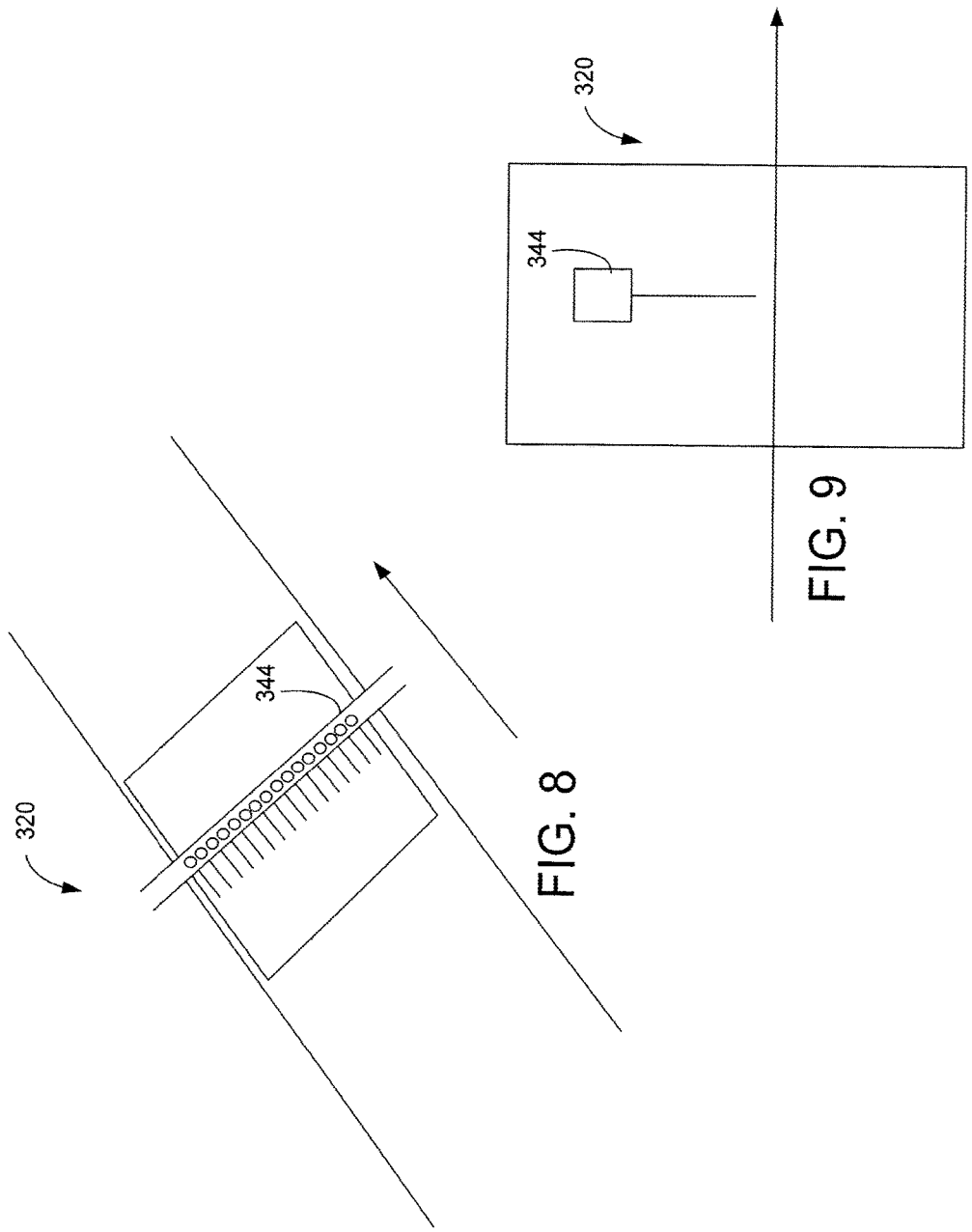

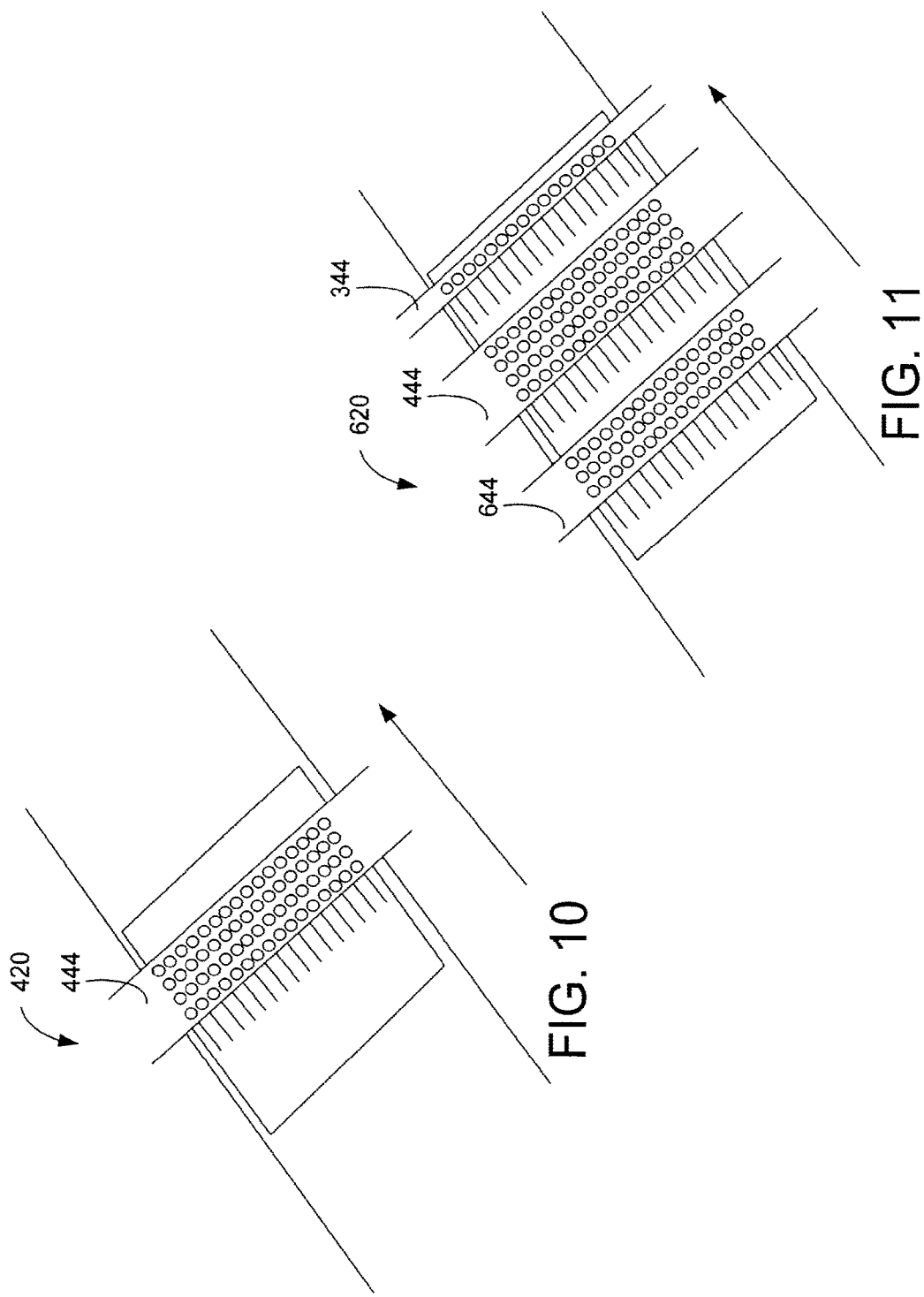

PRINTING USING COLOR CHANGEABLE MATERIAL

CROSS-REFERENCE TO RELATED PATENT APPLICATIONS

This application is a continuation of U.S. patent application Ser. No. 14/724,587, filed May 28, 2015, which is a continuation of U.S. patent application Ser. No. 14/098,356, filed Dec. 5, 2013, which is a continuation of U.S. patent application Ser. No. 12/864,490, filed Jul. 23, 2010, which is a national stage entry of PCT Application No. PCT/US08/84133, filed Nov. 20, 2008, which in turn claims the benefit of U.S. Provisional Application No. 61/062,213, filed Jan. 24, 2008, all of which are incorporated herein by reference in their entireties.

BACKGROUND

The present disclosure relates generally to the field of printing, such as commercial printing. The disclosure more specifically relates to printing fixed and/or variable data by changing the color of at least a portion of a material.

Current commercial printing technology generally employs planographic (e.g., offset, lithography, collatype, screenless), relief (e.g., letterpress and flexography), intaglio (e.g., gravure and steel die engraving), porous (e.g., screen printing and stencil), reprography (e.g., copying and duplicity) and digital (e.g., ink jets and toner) methods of print.

Commercial printing can include fixed data printing followed by variable data printing (VDP) employing an ink jet system. The fixed data printing can be performed using current commercial printing technology, such as high quality high speed four color printing press-based processes like web-offset. Today, variable data printing is often performed in the post-press process (e.g., after the fixed data is applied to a substrate) or as part of tasks related to personalization, mailing or delivery. The variable data printing can be used to print codes, messages, images, and other data unique to an item or group of items printed. For example, the variable data may comprise codes that can include batch or serial numbers, addresses for recipients of the items, names, personalized messages, advertising, consumer specific coupons, etc. Traditionally, ink jet systems are most commonly used to print the variable data. The ink jet systems used for variable data printing are often slower than the higher-speeds of the fixed data printing systems, which thus requires the printed materials to be transferred "off-line" to a different variable printing line or the use of high cost equipment such as accumulators or buffers to process the materials "in-line." Further, the manufacturer must continue to buy the ink long after purchasing the ink jet, resulting in an ongoing manufacturing expense. Yet further, the ink jet heads often become clogged and damaged, requiring labor and replacement costs. Additionally, the toxicity of some ink adds additional manufacturing complexity. Additionally, the ink jet systems have other drawbacks that may hinder performance of the overall printing process, as discussed above.

Alternatively, a printing line can utilize an entirely plateless printing process and perform fixed and variable data printing in a single line. Such systems rely on ink jets, electrophotography, ion or electron charge deposition, etc. As discussed above, such systems have drawbacks.

SUMMARY

According to one exemplary embodiment, a system for printing data on a substrate including a color-changeable material includes a processing circuit and a device including an energy source. At least a portion of each of a plurality of printed publications is printed on the substrate using a commercial printing press based on fixed data. The fixed data comprises data common to the plurality of printed publications. The device including the energy source is configured to add variable data to the substrate. The processing circuit is configured to receive the variable data and to control the energy source to change a color of the color-changeable material based on the variable data to provide at least a portion of the plurality of printed publications. The variable data comprises data changed between at least two of the plurality of printed publications. The processing circuit is configured to control the energy source to change the color of the color-changeable material in-line with a flow of the substrate through one of a printing line, a finishing line, or a packaging line of the commercial printing press.

According to another exemplary embodiment, a system for printing data on a substrate including a color-changeable material includes a processing circuit and a device including an energy source. At least a portion of each of a plurality of printed publications is printed on the substrate using a commercial printing press based on fixed data. The fixed data comprises data common to the plurality of printed publications. The the device comprising the energy source is configured to add variable data to the substrate for each of the plurality of printed publications after at least a portion of the printed publication has been printed on the substrate using the commercial printing press based on the fixed data. The processing circuit is configured to receive the variable data and to control the energy source to change a color of the color-changeable material based on the variable data to provide at least a portion of the plurality of printed publications. The variable data comprises data changed between at least two of the plurality of printed publications. The processing circuit is configured to control the energy source to change the color of the color-changeable material in-line with a flow of the substrate through one of a printing line, a finishing line, or a packaging line of the commercial printing press.

According to another exemplary embodiment, a method for printing data on a substrate including a color-changeable material includes printing at least a portion of each of a plurality of printed publications based on fixed data using a commercial printing press. The fixed data includes data common to the plurality of printed publications. The method further includes controlling a device comprising an energy source to change a color of the color-changeable material based on variable data to provide at least a portion of the plurality of printed publications. The variable data includes data changed between at least two of the plurality of printed publications. The device comprising the energy source is controlled to change the color of the color-changeable material in-line with a flow of the substrate through one of a printing line, a finishing line, or a packaging line of the commercial printing press.

BRIEF DESCRIPTION OF THE DRAWINGS

FIG. 8 is a perspective schematic view of an optical matrix laser printing apparatus configuration according to one exemplary embodiment.

FIG. 9 is a side plane view of the optical matrix printing configuration of FIG. 8, according to one exemplary embodiment.

FIG. 10 is a perspective schematic view of an optical matrix laser printing apparatus configuration according to an exemplary embodiment.

FIG. 11 is a perspective schematic view of an optical matrix laser printing apparatus configuration according to another exemplary embodiment.

DETAILED DESCRIPTION OF THE EXEMPLARY EMBODIMENTS

Figure 1:
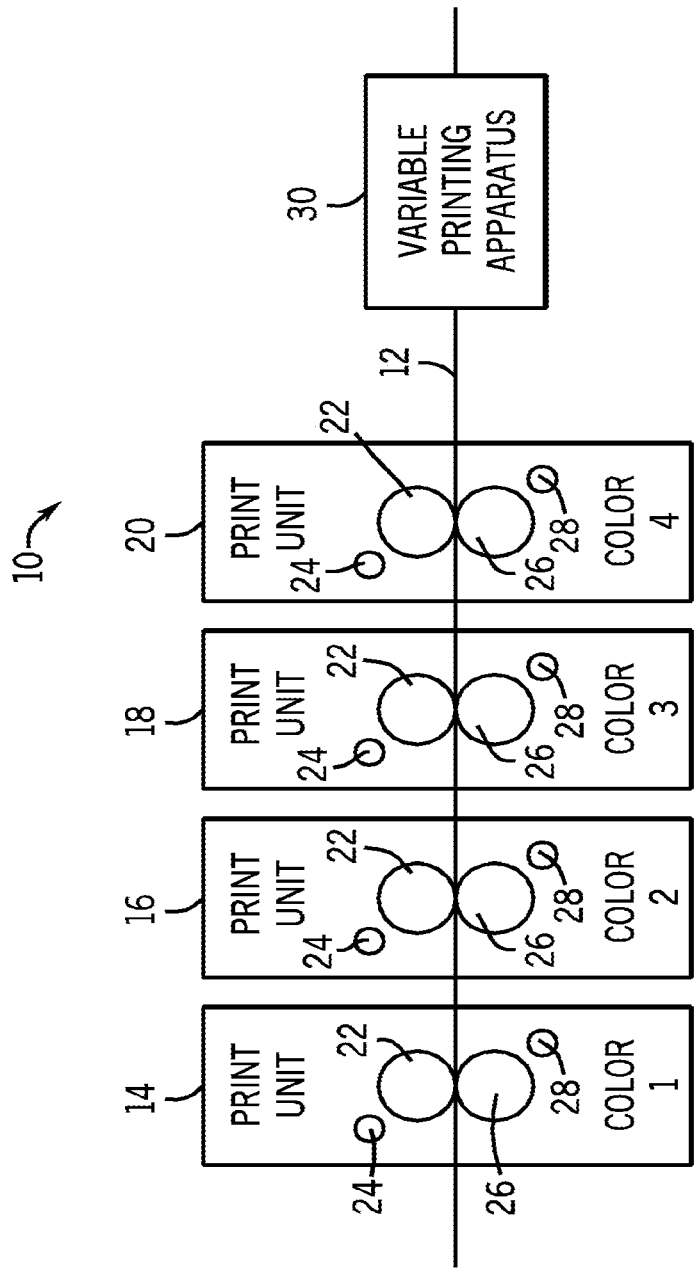
FIG. 1 is a schematic block diagram of a printing line according to one exemplary embodiment.

Embodiments described herein can provide an improved printing process for fixed and/or variable data printing. Various embodiments can replace ink jets with an improved technology capable of printing fixed and/or variable data; provide high speed fixed and/or variable data printing that is not prone to clogging; provide a combination of a higher speed fixed and/or variable data printing process with a high speed, high resolution, high quality fixed data printing process; provide an efficient, high quality, high speed fixed and/or variable printing apparatus and process; and provide a non-ink based fixed and/or variable data printing process. Further, various embodiments can provide a fixed and/or variable data printing process that can be integrated into a high speed, four color printing press operation.

Yet further, various embodiments can provide a printing process which can replace a conventional digital, web based or gravure based printing process with a laser printing process to reduce printing time, improve efficiency, reduce the costs associated with inks, and provide greater flexibility. Various embodiments can provide a printing process which prints from an energy source to a color-changeable material with a large amount of data to provide for graphical images, pictures, photographs, and other images customarily found in a printed publication or on packaging, for example product packaging. Various embodiments can provide an energy source configured to print on a substrate at a high speed with a high resolution.

Printing Overview

Data, both variable and fixed, may be printed on a substrate, printed material, or packaging at any point during a commercial printing process, including on a printing and/or a finishing line, or a packaging process. The substrate may be a generally flexible substrate, a generally stiff or rigid substrate, a semi-rigid substrate, etc. The substrate may be made from a variety of materials including, without limitation, paper, plastic, metal, laminate, or any combination thereof. The printed material may be a continuous web, sheets of paper, paper which may be coated or uncoated, a printed publication or other printed material, etc. Printed publications may include any printed media intended for distribution, typically by mailing, to a wide audience, such as hundreds, thousands, or more. Examples of types of printed publications may include catalogs, magazines, bound and unbound advertisements, newspapers, direct marketing and mailing pieces, inserts, onserts, signatures or forms used to make any of the above, etc. "Variable data" may comprise elements such as text, graphics, images, data or information which may be changed from one print operation to the next or from one series of print operations to the next, or a combination thereof. Variable data may be received from a database, external file, memory, or other data source. In some embodiments, variable data may be changed without stopping or slowing down the printing process. The term variable data may be used to refer to data stored in a memory, to the indicia printed on the printed material based on the data stored in the memory, or to data represented in any other form. Variable data may be used to determine which of other variable data is to be printed on a substrate (e.g., demographic data may be used to determine which of different variable data advertisements to print) or variable data may represent the data that actually gets printed (e.g., the advertisement). Information printed on a substrate based on variable data may be custom messaging, custom graphics, or a combination thereof. A graphic or graphics may be a representation of data in a way that includes an image or a pictorial representation in addition to or instead of text.

In exemplary embodiments where the substrate is packaging, the packaging may generally be any material used to pack or label something, for example a box, carton, bag, tag, label, can, or bottle to package a product. A label may be part of a continuous strip, sheet or web of a backing material upon which are disposed labels having adhesive on one side. A tag may be a portion of a continuous strip, sheet or web of material defined by a perforation or other area to be cut to create the tag. In some exemplary embodiments, the packaging may be substantially non-flat, such as bottles, cans, or other materials having substantial sizes in three dimensions. The packaging may enclose or substantially enclose a product and may have opaque, transparent, and/or translucent portions. The packaging may have dimensions greater than about 0.02 inches in all three dimensions, greater than about 0.2 inches in all three dimensions, greater than about 2 inches in all three dimensions, any combination thereof, or other thicknesses or dimension. According to other exemplary embodiments, the packaging may be substantially flat, such as paper, cardboard, or plastic cards. In some exemplary embodiments, the packaging may be substantially flat at one step in a process and become substantially non-flat at a second step in a process (e.g., where cardboard is formed into a box), and printing may occur at either step of the process. For example, a plastic packaging may be applied to a package of meat, whereby the packaging becomes substantially non-flat due to the non-flat surfaces of the meat, and printing is applied to the plastic in its non-flat form. In various exemplary embodiments including substantially flat or non-flat packaging, the packaging may be composed of paper, cardboard, plastic, metal, wood, glass, fabric or fibrous material, foam, rubber, another material, or any combination thereof.

Packaging generally includes primary, secondary, and/or tertiary packaging units, materials or substrates. For purposes of this disclosure, "primary packaging" may be a packaging unit that is in contact with the product to be sold, that first envelops and holds the product, or that is the smallest unit of distribution or use in the packaging. For purposes of this disclosure, "secondary packaging" may be a packaging unit that is outside the primary packaging, that is in contact with the primary packaging, or that is used to group primary packaging together. For purposes of this disclosure, "tertiary packaging" may be a packaging unit that is used for bulk handling, warehouse storage, or transport shipping (e.g., a palletized unit load that packs into containers) or that is in contact with the secondary packaging and/or the primary packaging. According to various exemplary embodiments, the packaging may substantially or at least partially cover or enclose the product to be packaged, for example on at least two sides of the product to be packaged. Any of the printing or other processing steps or apparatus components described herein may be used to print on any of these types of packaging, or other types of packaging. For example, any of the printing or other processing steps or apparatus components described herein may be use to print the primary, secondary, and/or tertiary packaging units, materials, or substrates, which printing apparatus components may for example comprise commercial-type presses such as gravure and flexographic presses. Any of the printing steps may occur as part of an in-line process, wherein printing occurs on a same manufacturing line as a primary or other printing process (e.g., web offset printing, digital printing, etc.) or as part of an off-line process, wherein printing occurs in a place or on an apparatus separate and perhaps distant from the same manufacturing line as a primary or other printing process.

Variable data may include geographic, demographic, postal, personal, and/or book data or any combination of these types of information and other types of information not specifically identified here. Geographic information may include address data, regional data, state data, country data, language data, or other types of geographical or census data for each piece of printed material. Demographic data may include any data about the recipient or subscriber or class of recipients or subscribers of the printed media including personal data which may be used by a printing device configured to print personalized content on the printed media during a finishing operation as well as information based upon region, country, state, etc. Postal information may comprise any information useful to a postal delivery service or useful in taking advantage of the features offered by a postal delivery service including postal class data (e.g., as first class, second class, third class, standard, flat rate, and priority), private mailing services data (e.g., for FedEx, UPS, DHL, etc.), postal delivery information or sort information (e.g., carrier route number), zip code (e.g., 3 or 5 digit zip code data), sectional center facility (SCF) information, or any other geographic or postal rate data. Personal data may include age data, purchasing history data, buying habit data, income data, race or ethnicity data, sex data, religious data, hobby data, or any other data about a person or class of persons. Book data may include information about the book, magazine, catalog, signature, or other printed material being assembled including the title of the printed material, size data representing a size of at least one dimension of the printed media (e.g., a length to be trimmed, a length post-trim, lengths or widths, or locations/coordinates at which to set a knife or blade for trimming, etc.), page count, publisher, version, or any other information about the book, magazine, catalog, signature or other printed media being assembled. The variable data may be used, for example, to tailor advertisements or may also include billing information that may be provided on billing forms.

According to one example, variable data may comprise a map, text, and/or graphics related to a retail store or stores or dealer in the vicinity of an address of a recipient of a printed publication. The map, text, and/or graphics may provide turn-by-turn directions, store address, store phone number, store hours, and/or other information relating to the retail store.

According to another example, variable data may comprise bar codes representing certain data or other information, for example address data, universal product code (UPC) data, price data, or other data.

According to another example, variable data may be demographic or geographic data used in a printing system to determine which of a plurality of advertisements to print in a printed publication. For example, the printing system may select one of a plurality of advertisements associated with different income levels, gender, age ranges, or other demographic or geographic data and print the advertisements in the printed publication associated with the relevant demographic or geographic data.

According to another example, variable data may comprise information printed on a printed publication (e.g., in a header or footer or other location of a printed publication) representing an advertisement for a particular dealer or retail location based on a particular region to which the publication is being distributed or mailed.

According to another exemplary embodiment, variable data may comprise information printed on product packaging representing product numbering, naming, expiration information, customization information, shipping or mailing information, or other information related to a product to be packaged. In other embodiments, the variable data may be data directed to a certain geographic or demographic group.

For purposes of this disclosure, "fixed data" may be any common information added or printed to multiple printed materials that does not change for each printed material. This fixed data may include barcodes, names, locations, numbers, graphics, text, advertisements, articles, product numbers, product information, or any other information that may be commonly printed on multiple printed materials.

For purposes of this disclosure, a "printing line" may be any type of printing press application. For example, a printing line may include offset or gravure applications where at least one layer is applied via a printing blanket or plate or via a cylinder using one or more printing units (e.g., cyan, magenta, yellow, and black printing units), or alternatively a digital type press such as traditional or drop-on-demand ink jet technology presses.

For purposes of this disclosure a "finishing line" may be any in-line or off-line process performed on the printed material after the printing is applied (i.e., after the printing line). Such a process may include binding (e.g., with glue or another adhesive or binder), stitching (e.g., with wire or another stitching material), trimming, gathering, collating, varnishing, laminating, embossing, bronzing, die-stamping, folding, perforating, punching, round cornering, padding, tin-edging, addressing, mail assembly and/or sorting, slitting, or wrapping tasks or functions, or any combination thereof. It is noted that a printing line and finishing line may be combined in-line, at least in part, to perform both printing processes and finishing processes or they may be separate lines with the printed materials transferred from the printing line to the finishing line for further processing. In either an inline or offline finishing process a message, address, or other information that includes variable data may be included on blow-in material, bind-in material, stickers, onserts, inserts, tipons, or other printed materials.

According to various exemplary embodiments including packaging, the packaging can be printed with fixed data for substantially all discrete packaging units in a print run, with variable data for substantially all packaging units, or any combination of fixed and variable data. Labels can be printed with information and then applied to the product or other product packaging.

Exemplary Color-Changeable Materials

A color-changeable material (alone or within a coating) may be added to the surface of a printed or unprinted substrate. This can be done before data (fixed and/or variable) is printed. Alternatively, a color-changeable material may be designed, fabricated, integrated, or mixed within the paper itself. The color-changeable material may be between at least two substrates, wherein the substrates may be the same type of substrate or different substrates (e.g., one substrate being paper and one substrate being a laminate, or other substrate combinations). The color-changeable material may be embedded within plastic, for example a plastic coating on a printed material or a plastic wrap around multiple printed materials. It is noted that the color-changeable material can be applied or added at any point in a process from paper manufacturing through shipping of a printed product. In one exemplary embodiment, paper can be supplied having the color-changeable material from a paper manufacturer. In such an embodiment, the color-changeable material can be applied during the paper manufacturing process. In other embodiments, paper may be coated with one or more layers or portions of color-changeable materials or coatings comprising a color-changeable material at a printing facility, before, during or after any of a printing line, a finishing line, a co-mailing line, etc. The color-changeable material may be applied by a coating applicator system which may comprise a sprayer, a press or print unit, a pad, a flexo press, ink jet type head, fan head, or other coating applicator system or process, as described in greater detail below.

The coating may comprise a vehicle and a color-changeable material. In a preferred embodiment, the coating is translucent or transparent. In yet further embodiments, the coating does not provide a noticeable change to paper color, ink color, or varnish color as observed by an ordinary consumer of the print medium. In yet another embodiment, the coating is colored or opaque.

The vehicle may be water based, UV curable, solvent based, or any other material without limit to the vehicle composition. Common vehicle component materials may comprise modified polyvinyl alcohols, optical brighteners (e.g., including but not limited to stilbene derivatives, clay, calcium carbonate, amorphous silica), and other commonly known ingredients in the paper making process (surfactants, biocides, defoamers, humectants, fillers, dyes, pigments, etc.). In one exemplary embodiment, the coating may comprise a carbohydrate and a metal salt (e.g., alkali metal, alkaline earth metal, iron oxide/salts, organometallics, etc.). According to another exemplary embodiment, the coating may comprise a vinyl chloride/acetate copolymer; a methyl ethyl ketone; and one or more of zinc chloride, zinc oxide, calcium silicate, kaolin, Zinc 3,5-di-tert butyl salicylate, or a ferrocenium salt. According to another exemplary embodiment, the coating may comprise a vinyl chloride/acrylic acid copolymer, water, and zinc oxide. According to another exemplary embodiment, the coating may comprise hydroxyl propyl cellulose, water, and magnesium chloride. According to another exemplary embodiment, the coating may comprise methyl hydroxy propyl cellulose, water, and magnesium chloride. According to another exemplary embodiment, the coating may comprise ethyl cellulose, ethanol, and calcium hydroxide. According to another exemplary embodiment, the coating may comprise sodium carboxy methyl cellulose, water, and calcium hydroxide. According to still another exemplary embodiment, the coating may comprise sodium carboxymethylcellulose, water, and magnesium chloride (e.g., $MgCl_2.6H_2O$). According to yet another exemplary embodiment, a mixture of wax and an ethanolic solution may be applied to the coating.

The color-changeable material may be any material that can change color or appearance upon irradiation with a laser or other energy source. In one example, the color-changeable material may comprise inorganic metals and compounds, color forming dyes, diacetylene pigments or polymers, other dyes and pigments (organic and/or inorganic), and/or microencapsulated materials (of single or multiple compositions).

According to other exemplary embodiments, the color-changeable material may be composed of a metal, molybdenum, titanium, zinc, a polydiacetylene-based compound, a diacetylene-based compound, ammoniumoctamolybdate (AOM), another molybdenum compound, a vanadium compound, a tungsten compound, a compound containing a transitional metal, or any other material that may allow, promote, provide, or have a composition adequate for changing of color in response to an energy source such as a laser, heat, or other light exposure.

According to one exemplary embodiment, the color-changeable material may be mixed with a solvent based or water based vehicle in a concentration ranging from about 1% to about 80, or about 1% to about 40% w/v. According to another exemplary embodiment, the color-changeable material may be mixed in a varnish, for example a modified or non modified tall oil rosin base in a concentration ranging from about 1% to about 50% w/v, or about 1% to about 30% w/v. According to other exemplary embodiments, the color-changeable material may be combined in an aqueous or non-aqueous solution or material. The color-changeable material or coating can be generally applied at a thickness of about 1 to about 50 microns, about 0.5 to about 25 microns, about 1 to about 15 microns, about 1 to about 10 microns, about 1 to about 7 microns, and about 2 to about 7 microns; however, according to other exemplary embodiments, the coating may be applied at other thicknesses greater than or less than the stated ranges. The coating may be applied to both coated and uncoated paper stock. For example, water based coatings may be used with uncoated paper and solvent based coatings may be used with coated paper or nonabsorbtive substrates. In other examples, polymers which will crosslink may be used in coatings used on nonabsorbtive substrates. Examples of polymers that may be used with solvent based systems include polyvinylbutyrals, cellulose acetoproprionate, cellulose acetate butyrate and nitrocellulose or copolymers of vinyl acetate/vinyl chloride as well as energy curable polymers such as but not limited to acrylic, epoxy or any other curable vehicle including urethane resins, epoxy resins, or unsaturated oils such as linseed oil or derivatives there of, or any other organic binder. Driers may also be used to dry the coatings after they are applied to the substrate. Drying systems may include, for example, infrared driers or convection ovens. Other suitable drying systems may include both heat and exhaust to remove solvents, which will aid in drying coatings that use solvents with higher boiling points. The coating may also contain catalysts to enhance the rate of drying. One of the components for the catalysts may be a polyvalent metal salt. In one embodiment, the polyvalent metal salt may be substantially soluble in water. The salt may comprise a polyvalent metal cation and an inorganic or organic anion component. The polyvalent metal cation may be selected from $Ca^{2+}$, $Cu^{2+}$, $Ni^{2+}$, $Mg^{2+}$, $Zn^{2+}$, $Ba^{2+}$, $Al^{3+}$, $Fe^{3+}$ and $Cr^{3+}$. The anion component of the polyvalent metal salt may selected from a nitrate group, a chlorate group, a carboxylate group and a halogen ion such as Cl—, I—, and Br—. A particular embodiment of a polyvalent metal salt is calcium chloride dehydrate. The amount of polyvalent metal salt in the promoter formulation may be between about 2 to about 10 percent by weight of the formulation.

Variable and/or fixed data (i.e., text and/or graphics) may be printed using the color-changeable material or coating and may be printed in color or in monochrome (e.g., black). It is noted that in certain exemplary embodiments where a printing surface is of a relatively dark color (e.g., black, red, blue, etc.), black print may not by readily visible by a consumer. Accordingly, on such a surface the data may be printed in a contrasting color, such as white on black, by changing the color-changeable material.

The coatings, as they relate to commercial printing, may include an ink, a varnish, a glue or other adhesive, a dye, a pigment, or any other layer that may be promote color change, or any combination thereof. The coating may include or be combined with an additive to facilitate a change of color. Such additives may include carbon black pigment, infrared (IR) or near infrared (NIR) absorbers such as copper hydroxyl phosphate (CHP), copper hydroxide phosphate, tin oxide, or any other metal salts capable of absorbing energy in the form of radiation, or dyes capable of absorbing the radiation such as but not limited to N,N,N', N'-Tetrakis(4-dibutylaminophenyl)-p-phenylene diaminium dehexafluoroantimonate, a conducting polymer such as Baytron P available from HC Starck of Newton, Mass., Iriodin LS820 available from Merck of Whitehouse Station, N.J., Pro-Jet 900NP available from Avecia of Cleveland, UK, or any other NIR absorber or other material that may facilitate laser treatment of a coating alone or in combination with a radical initiator or generator, a photoacid, or any other compound which upon activation initiates the desired color change as then end effect. Other near IR absorbers can also be chosen from the group comprising transition metal salts, sulfides, clays, micas, $TiO_2$, carbonates, oxides, talc, silicates, aluminosilicates, dyes, metal complex dyes, conducting polymers and combinations thereof or any other inorganic compound which absorbs infrared radiation. Thermal radical initiators may also be used such as ABCN or AIBN or any thermal radical initiator available, for example as available from Dupont, that may trigger color change in a coating. UV Photoacid generators (PAGs) may also be used, such as bisphenol A, for example as available from Dow Industrial and Ciba.

Table 1 below describes a number of example thermal free radical initiators that may be used. Amines can significantly increase the decomposition rates of peroxides, e.g., addition of N,N-dimethyl aniline to benzyl peroxide causes the latter to decompose rapidly at room temperature. Per sulfate decomposition is generally pH dependent.

TABLE 1

Decomposition Rates and 10-Hour Half-life Temperatures of Common Thermal Initiators (arranged alphabetically by initiator) ["Polymer Handbook", Eds. Brand up, J; Immerged, EX.; Grille, IA., 4th Edition, John Wiley, New York, 1999, II/2-69; Aldrich Catalog No. Z41,247-3.]

| Aldrich Cat. No. | Initiator | Solvent | T(° C.) | $K_d(s^{-1})$ | 10 h Half-life ° C. (Solvent) |
|---|---|---|---|---|---|
| 44,146-5 | tert-Amyl peroxybenzoate | | | | 99 (benzene) |
| 11,816-8 | 4,4 Azobis(4-cyanovaleric acid) | Acetone | 70 | $4.6 \times 10^{-5}$ | 69 (water) |
| | | Water | 69 | $1.9 \times 10^{-5}$ | |
| | | Water | 80 | $9.0 \times 10^{-5}$ | |
| 38,021-0 | 1,1'-Azobis(cyclohexanecarbonitrile) | Toluene | 80 | $6.5 \times 10^{-5}$ | 88 (toluene) |
| | | | 95 | $5.4 \times 10^{-5}$ | |
| | | | 102 | $1.3 \times 10^{-4}$ | |
| 44,109-0 | 2,2'-Azobisisobutyronitrile (AIBN) | Benzene | 50 | $2.2 \times 10^{-6}$ | 65 (toluene) |
| | | | 70 | $3.2 \times 10^{-5}$ | |
| | | | 100 | $1.5 \times 10^{-3}$ | |
| 17,998-1 | Benzoyl peroxide[2] | Benzene | 60 | $2.0 \times 10^{-6}$ | 70 (benzene) |
| | | | 78 | $2.3 \times 10^{-5}$ | |
| | | | 100 | $5.0 \times 10^{-4}$ | |

TABLE 1-continued

Decomposition Rates and 10-Hour Half-life Temperatures of Common Thermal Initiators (arranged alphabetically by initiator) ["Polymer Handbook", Eds. Brand up, J; Immerged, EX.; Grille, IA., 4th Edition, John Wiley, New York, 1999, II/2-69; Aldrich Catalog No. Z41,247-3.]

| Aldrich Cat. No. | Initiator | Solvent | T(° C.) | $K_d(s^{-1})$ | 10 h Half-life ° C. (Solvent) |
|---|---|---|---|---|---|
| 44,169-4 | 2,2-Bis(tert-butylperoxy)butane | Benzene | | | 100(benzene) |
| 38,814-9 | 1,1-Bis(tert-butylperoxy)cyclohexane | Benzene | 93 | $1.9 \times 10^{-5}$ | |
| 38,809-2 | 2,5-Bis(tert-butylperoxy)-2,5-dimethylhexane | Benzene | 115<br>145 | $1.1 \times 10^{-5}$<br>$4.7 \times 10^{-4}$ | 120 (benzene) |
| 32,953-3 | 2,5-Bis(tert-butylperoxy)-2,5-dimethyl-3-hexyne | Benzene | | | 125 (benzene) |
| 44,171-6 | Bis(1-(tert-butylperoxy)-1-methylethyl)benzene | Benzene | | | 115 (benzene) |
| 38,808-4 | 1,1-Bis(tert-butylperoxy)-3,3,5-trimethylcyclohexane | Benzene | | | 85 (dibutyl phthalate) |
| 41,666-5 | tert-Butyl hydroperoxide | Benzene | 130<br>160<br>170<br>183 | $3 \times 10^{-7}$<br>$6.6 \times 10^{-6}$<br>$2.0 \times 10^{-5}$<br>$3.1 \times 10^{-5}$ | 170 (benzene) |
| 38,807-6 | tert-Butyl peracetate | Benzene | 85<br>100<br>130 | $1.2 \times 10^{-6}$<br>$1.5 \times 10^{-5}$<br>$5.7 \times 10^{-4}$ | 100 (benzene) |
| 16,852-1 | tert-Butyl peroxide | Benzene | 80<br>100<br>130 | $7.8 \times 10^{-8}$<br>$8.8 \times 10^{-7}$<br>$3.0 \times 10^{-5}$ | 125 (benzene) |
| 15,904-2 | tert-Butyl peroxybenzoate | Benzene | 100<br>130 | $1.1 \times 10^{-5}$<br>$3.5 \times 10^{-4}$ | 103 (benzene) |
| 44,147-3 | tert-Butylperoxy isopropyl carbonate | Benzene | | | 98 (aliphatic hydrocarbons) |
| 24,750-2 | Cumene hydroperoxide | Benzene | 115<br>145 | $4.0 \times 10^{-7}$<br>$6.6 \times 10^{-6}$ | 135 (toluene) |
| 28,908-6 | Cyclohexanone peroxide | Benzene | | | 90 (benzene) |
| 32,954-1 | Dicumyl peroxide | Benzene | | | 115 (benzene) |
| 29,078-5 | Lauroyl peroxide | Benzene | 40<br>60<br>85 | $4.9 \times 10^{-7}$<br>$9.2 \times 10^{-6}$<br>$3.8 \times 10^{-4}$ | 65 (benzene) |
| 44,182-1 | 2,4-Pentanedione peroxide | | | | 125 (triethyl phosphate) |
| 26,933-6 | Peracetic acid | | | | 135 (toluene) |
| 21,622-4 | Potassium persulfate[3] | Water<br>0.1M NaOH | 80<br>50<br>60<br>80<br>90 | $6.9 \times 10^{-5}$<br>$9.5 \times 10^{-7}$<br>$3.2 \times 10^{-6}$<br>$9.2 \times 10^{-5}$<br>$3.5 \times 10^{-4}$ | 60 ($H_2O$)<br>70 (0.1M NaOH) |

According to one exemplary embodiment, the laser may affect a color change in the color-changeable material at the locations at which the laser beam strikes the coating. In one embodiment, the greater the selected energy from the laser, the more intense the color or different colors. For example, a laser beam with a higher intensity may provide a more intense color or different colors than a laser beam of a lower intensity. Likewise, a laser beam that is applied to a coating for a longer period of time than another laser beam may provide a more intense color or different colors. The coating and energy can be configured so that different types of phase changes occur that result in different colors. For example, different frequencies from the laser may cause the coating to provide different colors or intensities. According to one exemplary embodiment, the laser may be capable of printing in a subtractive color space, including for example at least RGB (red, blue, green), at least RBY (red, blue, yellow), and/or any one of red, green, blue, yellow, cyan, magenta, black, or a combination thereof. According to another exemplary embodiment, the laser may be capable of printing in white. According to other exemplary embodiments, the laser may change the coating to any color that may be the effect of a phase change. Phase change in polymerized diacety-lenes alters the effective conjugation length which leads to visual color changes of the material. These properties can be thermally reversible or irreversible depending on the chemistry selected.

According to another exemplary embodiment, the energy source may be configured to change the color of the color-changeable material by changing an oxidization state of the color-changeable material. For example, molybdenum ions may be used as a color-changeable material. The molybdenum ions may be combined into a coating that has a first color. By irradiating the coating with a laser beam, the oxidation state of the molybdenum ions may decrease (e.g., from +4 to +3, from +6 to +5, etc.), which may occur from oxygen elimination or transfer of electrons from nearby organic material that is oxidized (loses electrons) upon heating. The coating may then change to a second color (e.g., black). It is noted that according to other exemplary embodiments, any other ions and/or metals (e.g., transition metal ions such as vanadium, tungsten or other transition metal elements) may be added to the coating that are capable of having their oxidation state changed by a laser and that change color when irradiated with the laser.

According to another exemplary embodiment, the energy source may be configured to change the color of the color-changeable material by polymerizing the color-changeable materials. For example, a color-changeable material may include a number of carbon chains, acetylenic or polyacetylenic compounds, and other molecules. An example of such material includes diacetylene-based molecules. When the coating is irradiated by the laser, bonds between carbon atoms of the carbon chains and the atoms of the other molecules may break into free radical carbenes. Thereafter, the free carbon radicals may attack other molecules to initiate polymerization of the color-changeable material. Appearance of color from the color-changeable material may be due to the formation of the polymers containing the conjugated bonds and the ability of the conjugated bonds or polymerized molecules to absorb a different spectrum of light. This polymerization and variable absorption may ultimately change the color of the coating. For example, 10,12-pentacosadiynoic acid may be milled into a solution of 10% polyvinyl alcohol. The coating can be applied to uncoated paper using a Meyer bar and allowed to dry at ambient temperature. Upon irradiation at about 254 nm, the coating may turn blue. Heating the coating or applying higher intensity radiation can then turn the coating red and eventually a golden yellow color, it is believed by further conjugating bonds of the polymerized molecules. In another embodiment, a single color can be achieved by incorporating a lactone or fluoran compound such as one of the Pergascript leuco dyes available from Ciba along with bis-phenol A in a 1:1 ratio in a 10% polyvinyl alcohol solution. It is noted that the solutions are not limited to the amounts described above, for example the leuco dye can be between about 1% and about 25% by weight. The coating can be applied using a meyer bar and may be allowed to dry at ambient conditions or with gentle heating. Sensitizers, for example naphthyl benzyl ether, paraffin wax, or polycyclic aromatic hydrocarbons or aromatic ketone compounds may also be included to adjust to desired thermal sensitivity.

According to another exemplary embodiment, the energy source may be configured to change the color of the color-changeable material by breaking an encapsulant to release a dye in the coating. In such examples, the coating may further include a developer. For example, the coating may include a leuco dye surrounded by a membrane sensitive to concentrated light, such as from a laser. The capsule may be comprised of any number of formaldehyde/melamine or urea materials or any other polymerizable materials. The capsule may also comprise materials which cause the capsule to rupture under radiation. As an example, such materials may include, but not be limited to, the inclusion of toluene or any of a number of volatile organic compounds. When energy, such as laser energy, hits the capsule the membrane may rupture and release the dye into the coating and thus change the color of the coating to the color of the dye. Table 2 below lists a number of developers that may be used according to exemplary embodiments.

TABLE 2

List of Example Developers
[http://www.tcieurope.eu/en/product/materials-chem/F016.shtml].

1,1'-Methylenedi-2-naphthol
1,1,1-Tris(4-hydroxyphenyl)ethane
1,1-Bis(3-cyclohexyl-4-hydroxyphenyl)cyclohexane
1,1-Bis(4-hydroxy-3-methylphenyl)cyclohexane
1,1-Bis(4-hydroxyphenyl)cyclohexane
1,3-Bis[2-(4-hydroxyphenyl)-2-propyl]benzene
1-Naphthol TABLE 2-continued List of Example Developers
[http://www.tcieurope.eu/en/product/materials-chem/F016.shtml].

2,2'-Biphenol
2,2-Bis(2-hydroxy-5-biphenylyl)propane
2,2-Bis(3-cyclohexyl-4-hydroxyphenyl)propane
2,2-Bis(3-sec-butyl-4-hydroxyphenyl)propane
2,2-Bis(4-hydroxy-3-isopropylphenyl)propane
2,2-Bis(4-hydroxy-3-methylphenyl)propane
2,2-Bis(4-hydroxyphenyl)propane
2,3,4-Trihydroxydiphenylmethane
2-Naphthol
4,4'-(1,3-Dimethylbutylidene)diphenol
4,4'-(2-Ethylhexylidene)diphenol
4,4'-(2-Hydroxybenzylidene)bis(2,3,6-trimethylphenol)
4,4'-Biphenol
4,4'-Dihydroxydiphenyl Ether
4,4'-Dihydroxydiphenylmethane
4,4'-Ethylidenebisphenol
4,4'-Methylenebis(2-methylphenol)
4-(1,1,3,3-Tetramethylbutyl)phenol
4-Phenylphenol
4-tert-Butylphenol Zone Refined (number of passes: 19)
9,9-Bis(4-hydroxyphenyl)fluorene
alpha,alpha'-Bis(4-hydroxyphenyl)-1,4-diisopropylbenzene
alpha,alpha,alpha'-Tris(4-hydroxyphenyl)-1-ethyl-4-isopropylbenzene
Benzyl 4-Hydroxybenzoate
Bis(4-hydroxyphenyl) Sulfide
Bis(4-hydroxyphenyl) Sulfone
Methyl 4-Hydroxybenzoate
Resorcinol
Tetrabromobisphenol A According to another exemplary embodiment, the energy source may be configured to change the color of the color-changeable material by changing a phase of the material. In some embodiments, a phase change may lead to an irreversible color change as seen in leucodye chemistry.

According to another exemplary embodiment, the energy source may be configured to change the color of the color-changeable material by changing an effective conjugation length of the material. For example, monomer diacetylenes have low variable melting points. However, once polymerized, a thermal decomposition or a glass transition-like (at a glass transition temperature Tg) change is seen.

Application of Color-Changeable Material to Substrate

According to one exemplary embodiment, the coating may be applied by a roll coater. In another exemplary embodiment the coating may be applied by use of an imprinter (e.g., of a cylindrical shape). In still another exemplary embodiment, the coating may be applied as a coating by an ink jet spray or other sprayer. As stated above, the coating may be applied by a coating applicator system which may comprise a sprayer, a press or print unit, a pad, a flexo press, ink jet type head, fan head, or other coating applicator system or process. The coating applicator system may depend on the application. For example, a roller or pad may be used for laser treatment as part of a press operation, while a sprayer may be used for laser treatment as part of a finishing operation.

Color-changeable materials may be provided to areas spanning substantially an entire sheet of a substrate (e.g., a sheet, a continuous web, etc. which may be paper, packaging, other materials, etc.) or substantially an entire printing area of the substrate (e.g., which may be less than about 95% of a width of the substrate, less than about 80%, less than about 50%, less than about 25%, less than about 10%).

Color-changeable material may be applied to an entire substrate or only substantially to areas which may be printed by the selected energy source or laser printing system.

According to one exemplary process, a paper substrate is manufactured by a paper manufacturing entity by adding a color-changeable material to the paper substrate as a coating, to or within the paper composition when in liquid form, or at other steps in the paper manufacturing process. The color-changeable material or materials may be infused in the substrate, such as a paper composition, absorbed by the paper composition, combined with the paper composition, or otherwise combined with or made with or integrated within the paper composition. The result may be a stack of printed sheets, a continuous web of paper on a roll, etc. The paper substrate with color-changeable material is then packaged and shipped to a user, such as a printing entity (e.g., Quad/Graphics, Inc. of Sussex, Wis.), a publishing entity, or other user entity.

Figure 24:
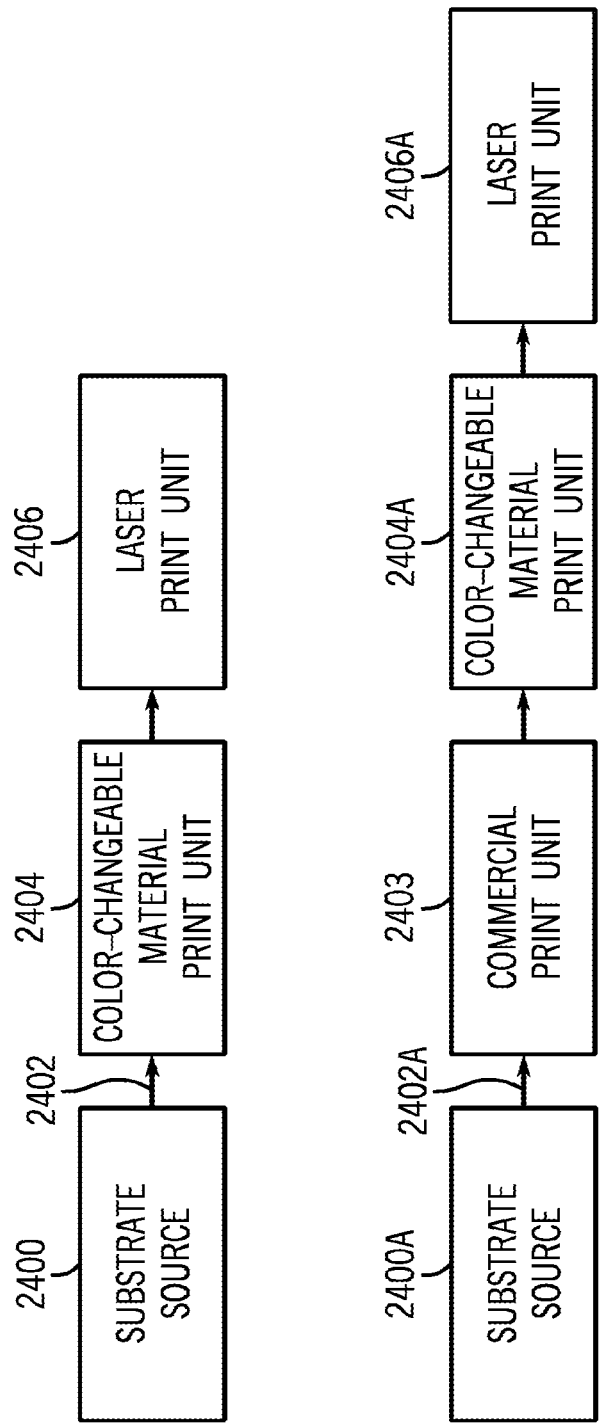
FIG. 24 is a block diagram of a system for applying a color-changeable material to a substrate in-line with one or more printing units, according to exemplary embodiments.

According to another exemplary process, the printing entity or other third party may apply the color-changeable material as a coating to a paper substrate received from a paper manufacturing entity. Exemplary systems for implementing such a process are shown in FIG. 24. In a first embodiment, a substrate source 2400 provides a substrate 2402 to a color-changeable material print unit 2404. The color-changeable material print unit 2404 provides the substrate to a laser print unit 2406. Elements 2400-2406 may be part of a finishing line or a printing line. In this embodiment, print unit 2404 is in-line with the laser print unit 2406. The substrate source 2400 may comprise a roll of a continuous web of paper, a stack of sheets of paper, etc., and a feed device configured to feed the substrate 2402 to the color-changeable material print unit 2404. The printing entity may apply the color-changeable material using the print unit 2404, such as a web offset or gravure print unit having plates configured to represent the printing area of the substrate (e.g., in rectangular, circular, square, or other form). For example, on a cover of a printed publication, print unit 2404 may be configured to print a coating sized to receive print representing an address block representing an address of a recipient of the printed publication. In another example, as shown in the embodiment comprising elements 2400A-2406A, a color-changeable material applicator 2404A (which may be a spray unit in this embodiment) may be provided on a printing line (i.e. in-line with a commercial print unit 2403) before, between, or after any of the color-specific print units 2403 in the printing line (e.g., CMYK units). In this manner, a portion of a printed publication may be created by printing in a web offset or gravure printing step while another portion of a printed publication is created by printing using a color-changeable material. Further, one or more colors may be printed with halftone dots or other markings having a predetermined density, dot size, etc. using a web offset, gravure, or other printing operation while other colors may be created using a color-changeable material and laser printing system described herein and overlaid to create a full range of colors (e.g., at least ten, twenty, or one hundred different perceptibly-different colors), as will be described in greater detail below.

Additional Characteristics of Exemplary Color-Changeable Materials

Exemplary color-changeable materials may be translucent and more preferably transparent or invisible before, during, or subsequent to application to or within the substrate or after drying, before being subjected to energy from the energy source. For example, a coating applied over a colored substrate may allow the colored substrate to be visible through the coating.

Exemplary color-changeable materials when applied to or within a substrate may, when dry, be malleable and capable of folding, cutting, etc. without cracking, scoring, marking, scratching, etc. The substrate comprising the color-changeable material or materials may also be of a sufficient composition to withstand large temperature differences (e.g., about −40 degrees C. to 100 degrees C.). The substrate may also be resistant to subsequent marking after treatment with the energy source, for example, by heat, cold, moisture, ambient light, sunlight, etc., which could fade or change the shading of the colored substrate.

Exemplary color-changeable materials may also exhibit selectivity in response to different treatments. For example, the color-changeable materials for forming each color should change to the desired color at parameters (e.g., wavelength of light, fluence, intensity, duration of treatment, etc.) different than others of the color-changeable materials which coat or are within the substrate. This selectivity may simplify control of which colors are formed in response to different parameters. For example, the parameters of the energy source needed to turn an additive blue should be controllably different than the parameters of the energy source needed to turn the same or second color-changeable material yellow.

Color-changeable materials may comprise additives, compounds, compositions, or other materials in the same composition or material, or may be in separate coatings or materials, or one integrated within the substrate and the second within a coating overlaying the substrate. Preferably, one coating may be applied comprising all additives or materials for all colors needed for a printing operation (e.g., CMYK (cyan, magenta, yellow, black), RGB (red, green, blue), RBY (red, blue, yellow), black and white, red and white, blue and white, or other color combinations). In another preferred embodiment, one additive or material is configured to change to each of the two, three, four, or more colors needed for a desired printing operation. Alternatively, different coatings may be used on the substrate for each of the two, three, four, or more colors needed for a desired printing operation.

Color-changeable materials may be applied with a coating thickness of about fifteen microns or less, about ten microns or less, about six microns or less, about three microns or less, or greater than about 3 microns or greater than about 6 microns in thickness.

The color-changeable materials may transform through at least a portion of the spectrum of visible color. In one embodiment, the color-changeable material may permit trapping if there is an incomplete cure in one pass (for example when using a diacetylene) that then allows for marking of a second color by additional irradiation. The color-changeable material may also exhibit dot gain-type properties, energy scattering, e.g., laser light scattering, as well as heat transfer to areas surrounding directly irradiated area.

Exemplary Energy Sources

According to some exemplary embodiments, printing of data (e.g., text or graphics) may be accomplished using a laser, for example a deflected or single-source laser, such as a scribing or vector-based laser which may be a fiber laser, a non-deflected or multiple-source laser, such as a laser diode array, which may be a raster or dot matrix type laser, or any combination thereof. Deflected or reflected refers to a characteristic of a laser source in which a mirror or other reflective element is used to aim, steer, or point the laser beam to a desired direction. The laser can be a UV, near infrared, far infrared, gamma, x-ray, YAG, or CO2 laser or any other laser or light source with a power, wavelength, frequency, and/or other laser parameters configured to change the color of at least a portion of a color-changeable material or coating covering at least a portion of a substrate or another color-changeable material or coating (e.g., multiple coatings may cover a substrate). The laser may be in the form of a scribing laser, fiber laser, a laser pump, a fiber-optic matrix, a laser diode, a laser diode array or any other form. A fiber laser is a laser in which the active gain medium is an optical fiber doped with rare-earth elements such as erbium, ytterbium, neodymium, dysprosium, praseodymium, and thulium. The laser may emit a beam having a wavelength of between about 0.1 angstrom and about 1 mm, between about 0.5 nanometer and about 100 micrometers, or between about 10 nm and about 1400 nanometers, or any combination thereof. In another embodiment, the laser may emit a beam having a wavelength greater than about 0.1 angstrom, greater than about 0.5 nm, greater than about 10 nm, greater than about 900 nm, greater than about 1400 nm, less than about 500 nm, or less than about 1 mm. The power of the laser may be between about 1 mW and about 100 W, between about 100 mW and 50 W, and between about 500 mW and about 10 W. In another embodiment, the laser may have a power of greater than about 1 mW, greater than about 100 mW, or greater than about 500 mW. The color of the coating may be changed by the laser to reflect the data to be printed (e.g., a personal message, other variable data, fixed data, etc.). This color may be changed by adjusting the frequency, phase, power, fluence, or other parameter of the laser.

In various alternative embodiments, the laser or other energy source may be configured to print on the substrate by marking, coloring, imprinting, affecting, or otherwise coloring (e.g., with any color, including black and white) the color-changeable material, either alone in the coating or within the substrate. The material may comprise a color alterable material, composition, compound, or additive, and may be subject to a phase change, oxidization change, polymerization, or other process, as described in greater detail below.

One example of a suitable laser is a Videojet 3320 laser marking system commercially available from Videojet Technologies of Wood Dale, Ill. This laser marking system includes a sealed-off CO2 laser rated at an output of 30 Watts and a 10.6 μm wavelength with a SHC 60 focusing lens. It is noted that according to other exemplary embodiments, other types of CO2 lasers, fiber lasers, laser diodes, laser diode arrays, UV lasers, near infrared diode lasers, YAG lasers, arrays of other lasers (e.g., CO2 lasers) or other lasers with sufficient power and fluence to change the color of a coating may be used. In one exemplary embodiment, the laser may be at least a 20 Watt laser. Various types of exemplary lasers are included in the table below:

| Manufacturer | Part number | Power output | Laser technology | Wavelength |
|---|---|---|---|---|
| Videojet | 3320 | 30 Watts | CO2 | 10,600 nm |
| DataLase | FL20 | 20 Watts | Fiber | 1070 nm |
| Domino | DSL1 | 25 Watt | CO2 | 10,600 nm |
| Macsa | K1030 Plus | 30 Watt | CO2 | 10,600 nm |
| Macsa | K1060 Plus | 60 Watt | CO2 | 10,600 nm |
| Keyence | ML-G9300 | 30 Watt | CO2 | 10,600 nm |
| Control Laser Corporation | Concord CO2 PowerMark | 25 and 50 watt | CO2 | 10,600 nm |
| Control Laser Corporation | ProWriter FL20 | 20 Watts | Fiber | 1064 nm |
| Control Laser Corporation | ProWriter D25T | 25 Watt | YAG | 1064 nm |

-continued

| Manufacturer | Part number | Power output | Laser technology | Wavelength |
|---|---|---|---|---|
| Control Laser Corporation | ProWriter D50 | 50 Watt | YAG | 1064 nm |

DataLase lasers are available from DataLase Inc. of Norcross, Ga. Domino lasers are available from Domino Printing Sciences of Cambridge, UK. Macsa lasers are available from Macsa Laser Solutions of Barcelona, Spain. Keyence lasers are available from Keyence Corporation of America of Woodcliffe Lake, N.J. Control Laser Corporation lasers are available from Control Laser Corporation USA of Orlando, Fla. Other lasers may include UV lasers (e.g., a UV diode pump) at about 266 nm, a UV laser at approximately 5 watts, a diode array laser at about 980 nm, a quadruple frequency YAG laser, a broadband UV lamp, a Blu-ray™ UV laser at about 405 nm, or other lasers. An exemplary laser diode array may comprise Super High Efficiently Diodes (SHED). An exemplary laser may be a 400 mW NIR laser manufactured by Quantel, in France. Another approach is to use an NIR laser and to apply a harmonic converter to generate UV wavelengths.

In other embodiments, including embodiments using laser diodes or laser diode arrays, each laser diode may be powered with about 0.4 watts to about 5 watts per element, or about 1 to about 3 watts per element, or between about 1 mW and about 100 W, or between about 100 mW and 50 W, or between about 500 mW and about 10 W, or approximately 400 mW per element in a diode array, or approximately 200 mW per element in a diode array. In another embodiment, each laser diode may be powered with greater than about 1 mW, greater than about 100 mW, or greater than about 500 mW per element. In another embodiment, each laser diode may be powered with about 1 W per element, greater than about 500 mW and/or less than about 2 W, greater than about 750 mW and/or less than about 1.5 mW, or other powers.

Such diodes and diode arrays may emit either NIR energy or UV energy, including Blu-ray® laser technology at 405 nm. In other embodiments, the laser may emit a beam having a wavelength of between about 0.1 angstrom and about 1 mm, between about 0.5 nanometer and about 100 micrometers, or between about 10 nm and about 1400 nanometers, between about 266 nm and about 980 nm, or any combination thereof. In another embodiment, the laser may emit a beam having a wavelength greater than about 0.1 angstrom, greater than about 0.5 nm, greater than about 10 nm, greater than about 900 nm, greater than about 1400 nm, less than about 500 nm, or less than about 1 mm.

According to some exemplary embodiments, a UV laser beam with a wavelength of less than about 400 nm may be used to change the color of a Diactelylene or Polydiacetylene (PDA) color-changeable material. According to other exemplary embodiments, a UV laser beam with a wavelength of greater than about 400 nm may be used to change the color of a color-changeable material composed of a combination of a PDA and a Photo-Acid-Generator (PAG).

Diode arrays may be fabricated or grown on wafers that can be combined to achieve variable lengths to be used for the specific application. The diode wafers may be cleaved to any desired length. Embodiments of laser diode arrays may be from about 1 inch to about 72 inches in any dimension, from about 1 inch to about 8 inches, at least about 1 inch, at least about 2 inches, at least about 8 inches. Such lasers may also be used with harmonic converters. According to some exemplary embodiments, the laser diode arrays may be of any length that is a multiple of about 10 mm.

In exemplary embodiments including laser diodes, the laser may include a thermal management system to reduce the amount of heat emitted from or absorbed by the electrode configuration of each laser diode. The electrodes may be fastened to a substrate or other element of the laser diode using a heat resistive adhesive. The cavity of one or more electrodes may be elongated to produce more power. The laser diode array may be manufactured by growing diode wafers. The diode wafers may be cleaved to any desired length.

Exemplary Printing and Finishing Speeds and Resolutions

In commercial printing, the laser may be used to affect a color change of at least a portion of a color-changeable material on a substrate moving along a printing line or finishing line at a predetermined speed that facilitates printing or finishing. According to various exemplary embodiments, printing speeds for web-offset, gravure type, digital presses, custom web printing (e.g., press and finishing or mailing on a single line) or other printing processes may include speeds more or less than about 8000 ft/min, more or less than about 4000 ft/min, more or less than about 3000 ft/min, more or less than about 1500 ft/min, more or less than about 1000 ft/min, more or less than about 500 ft/min, or more or less than about 250 ft/min. According to one various embodiments, printing speeds may include speeds greater than about 250 ft/min and less than about 8000 ft/min, greater than about 250 ft/min and less than about 4000 ft/min, greater than about 500 ft/min and less than about 4000 ft/min, greater than about 500 ft/min and less than about 3000 ft/min, greater than about 800 ft/min and less than about 3000 ft/min, greater than about 250 ft/min and less than about 1000 ft/min, greater than about 800 ft/min and less than about 3000 ft/min, greater than about 350 ft/min and less than about 500 ft/min, etc.

The laser may also be used to affect a color change of at least a portion of the color-changeable material on a substrate or other printed material on a finishing line. According to various exemplary embodiments, materials may move through a finishing line (e.g., on a conveyor) at finishing conveyor speeds (which carry the printed materials such as signatures or other printed publications to be treated) at speeds of more or less than about 800 pieces/min, more or less than about 700 pieces/min, more or less than about 600 pieces/min, more or less than about 450 pieces/min, more or less than about 250 pieces/min, more or less than about 200 pieces/min, etc. According to various exemplary embodiments, finishing conveyor speeds may be more than about 200 pieces/min and less than about 800 pieces/min, more than about 250 pieces/min and less than about 800 pieces/min, more than about 450 pieces/min and less than about 800 pieces/min, and so on. According to various exemplary embodiments, finishing conveyor speeds may be more than about 230 ft/min, more than about 290 ft/min, more than about 525 ft/min, more than about 700 ft/min, more than about 815 ft/min, and more than about 930 ft/min. According to various exemplary embodiments, finishing conveyor speeds may be more than about 230 ft/min and less than about 930 ft/min, more than about 290 ft/min and less than about 930 ft/min, more than about 525 ft/min and less than about 930 ft/min, etc. In some instances, pieces/minute can be used to roughly calculate the speed of the conveyor at feet/minute equal to about (#pieces per minute*14)/12.

The distance from the laser to the substrate may vary depending on the type of laser used, including for example its wavelength and power. According to one exemplary embodiment, the distance of a laser from the print medium may be less than about 15 inches. According to other exemplary embodiments, the distance of a laser from the print medium may be less than 1 mm, greater than about 0.1 mm, between about 0.1 mm and about 15 inches, or between about 1 mm and 15 inches, depending on the type of lens and laser used. In this regard, one may achieve greater marking speeds by placing the laser at a further distance from the substrate due to less distance the laser will have to move to print a character and because of the increased size of the print window. As the distance between the laser and the substrate decreases, less variance in print may occur due to vibration of the laser or movement of the substrate.

In one embodiment, the laser source is remote from the paper medium and fiber optic cables are used to communicate the light from the laser source to the paper. Such an embodiment allows the laser source to be placed in a less harsh environment and allows for improved cooling of the laser source. According to another exemplary embodiment, the data may be printed using other energy types, for example, an electron beam, gamma beams, x-ray beams, thermal IR, far IR or any other energy or light type generally capable of causing a phase changes so that the color of the coating may be changed selectively.

In one embodiment, the laser may achieve the desired marking speeds for commercial printing (either on the printing or finishing lines) by use of a system adapted to receive and output at least about 5 bytes or characters (e.g., about 40 bits) of data from a source of variable or fixed print data for printing every machine cycle. For purposes of this disclosure, a "machine cycle" may be the amount of time that it takes to print variable data on a single item of printed material via laser treatment as it moves along the line. According to other exemplary embodiments, the system may be adapted to output between about 5 and about 200 bytes or characters per cycle. According to various exemplary embodiments, the system may be configured to output more than or less than about 50 characters per printed publication, or more than or less than any of about 5, 10, 15, 50, 200, 500, or 1000 characters per printed publication. The laser may be configured for more than about 200 bytes or characters of data per cycle by using higher-speed data communication interfaces (e.g., Ethernet, Universal Serial Bus (USB), etc.), cache data source, less control data, use of multiple lasers, use of faster mirrors, such as micro-electro-mechanical systems (MEMS) for directing the laser beam, and other improvements in laser systems.

To calculate the number of characters printed per minute by the laser, one multiplies the number of characters output by the system by the printing press or finishing speeds (e.g., between about 200 and about 700 books/min). For example, if 5 characters are output by the system per cycle at a finish speed of about 200-about 700 books/min, according to various embodiments, printing speeds on the finishing line may include speeds between about 1000 char/min and about 3500 char/min. According to other exemplary embodiments where about 200 characters are printed per cycle at a finish speed of about 200-700 books/min, printing speeds on the finishing line may include speeds between about 40,000 char/min and about 140,000 char/min.

According to other exemplary embodiments where a Domino DSL1 laser with seven tubes and a printing capacity for two lines per tube is used, the system and laser may be adapted to print at about 820 ft/min. At twelve characters per inch and fourteen inch pin centers, the laser may print at about 288 characters per cycle.

Variable and/or fixed data may be printed with a resolution of more or less than about 75 dots per inch (dpi), about 100 dpi, about 200 dpi, about 300 dpi, about 600 dpi, about 720 dpi, about 1000 dpi, about 1500 dpi, about 2000 dpi, about 2500 dpi, about 3000 dpi, or about 5000 dpi. The data may be printed with a resolution of greater than about 300 dpi and less than about 600 dpi (e.g., when used on a finishing line), greater than about 600 dpi and less than about 720 dpi (e.g., when used on a press or printing line), greater than about 300 dpi and less than about 720 dpi, greater than about 75 dpi and less than about 1000 dpi, etc. These resolutions may be used at speeds described above or at least about 1000 ft/min (e.g., in a press or printing line configuration), at least about 500 ft/min or between about 350 and about 500 ft/min (e.g., on a finishing line), etc.

According to other exemplary embodiments, the laser may be used to affect a color change of at least a portion of a color-changeable material on a product or on packaging moving along a packaging line at a predetermined speed. According to some exemplary embodiments, the packaging may travel past the laser at a rate of at least about one foot per second. According to other exemplary embodiments, the packaging may travel past the laser at a rate of less than about ten feet per second. According to some exemplary embodiments, the laser may change the color of the packaging at a rate of between about 5 and about 200 characters per packaging unit as the packaging travels by the laser. According to other exemplary embodiments, the laser may change the color of the packaging at a rate greater than about 200 characters per packaging unit or fewer than about 5 characters per packaging unit as the packaging travels by the laser. According to some exemplary embodiments, the laser may mark the color changeable material with a resolution of between about 600 dpi and about 720 dpi. According to other exemplary embodiments, the laser may mark the color changeable material with a resolution of less than about 600 dpi or greater than about 720 dpi.

Communication

According to various exemplary embodiments, the system may communicate with the laser and/or printing or finishing line via a wired or wireless connection. According to other exemplary embodiments, this communication may by facilitated over Ethernet, LAN, USB, Firewire, RD-232, or RS-485 connections or another type of serial, parallel, or optical communication protocol, such as a proprietary communication protocol. According to other exemplary embodiments, the communication may by facilitated over a WAN, WiFi, WiMax, Bluetooth, RF, cellular, or another wireless communication protocol. These communication protocols can be used between a source of variable or fixed data and the laser (e.g., at a wired or wireless interface), or between other components of the system.

Location of Laser or Energy Source Printing Apparatus

A laser or energy source printing apparatus, such as a laser, can be placed anywhere along a printing line, a finishing line, or a packaging line. Variable and/or fixed data may be printed to materials, such as, for example, a paper web or paper sheet or packaging, that already includes fixed data printed thereon or to materials prior to printing fixed data thereon. Examples of where the laser may be placed in a commercial printing operation include at the beginning, end or at any point along any of (1) a printing line including, for example, before or after application of at least one layer of coating, before or after application of at least four layers of coatings such as CMYK colors, etc.; (2) a binding line, including a saddle stitching or perfect binding line; (3) a pre- or post-trimming operation; (4) a pre- or post-wrapping operation; (5) a mailing table; or (6) a mailing or delivery line. In another embodiment, the print media may be printed with fixed or variable data after blending of materials for combined mailing, which may be printed on a wrapper, through a wrapper onto the printed material within the wrapper, on a label affixed to the wrapper, etc. In one embodiment, the underside or inside of the pages of the printing medium may be printed with fixed or variable data during a finishing or binding process. According to an exemplary embodiment, fixed or variable data may be printed on the outside or exposed sheets of a printing medium.

Examples of where the laser may be placed in a packaging operation include at the beginning, end or at any point before or after a packaging feeder (e.g., primary packaging, secondary packaging, tertiary packaging, etc.), a product feeder, or any other point on a packaging line. For example, the laser may be placed for printing on the packaging material upstream of or at a point before the packaging material is cut or separated into discrete packaging components by a cutter or other converting machine.

According to one embodiment, printing fixed or variable data by affecting a color change of at least a portion of a coating with a laser may be done in lieu of conventional ink jet or laser jet or in combination with such equipment.

According to another exemplary embodiment, data may be printed by a laser as described herein on a flat card (e.g., inserts, tear-outs, etc.) prior to, during, or after binding, stitching, blowing, or onsetting to a book, magazine, or other printed material. According to still another exemplary embodiment, data may be applied on a cover for a printed material before, during, or after a stitching or binding process.

According to still another exemplary embodiment, a line may be configured to print both fixed and variable data. For example, the printing line may print fixed information (e.g., company name, product description or picture, etc.) on a billing form as well as variable data (e.g., customer name, customer address, amount, etc.) using the techniques of the present application. According to yet another exemplary embodiment, variable data may be printed using the apparatus described herein that applies the print based on preprinted codes on the printing medium.

According to yet another exemplary embodiment, the laser treatment apparatus may print variable data as bar codes. According to another exemplary embodiment, variable data may be printed as direct mailing/custom web or sorting information.

It is noted that if the wrong address is printed during finishing or if there is an ink spot or error on the printing plate of the web offset printing, a laser can be used to change the color of the material and blot out or correct the error. For web printing errors, this could save having to recreate a plate if the plate was created incorrectly or poorly.

A laser printer or other energy source may be located at least about 1 inch from the substrate which is to be printed upon, at least about 3 inches, at least about 6 inches, or at least about 12 inches.

In one embodiment, a coating may be applied using a print unit on a commercial press, such as a Goss-style M1000 press. The print unit may apply a coating comprising the color-changeable material, such as AOM, to the substrate with the print unit. The coating may be applied to the entire substrate or to selected portions of the substrate (e.g., which may be less than half of a page of a printed publication, less than a quarter page, less than an eighth of a page, etc.). In one embodiment, the coating may be applied to at least a portion of a printed publication, and even more specifically may be applied to an address block or some other portion of a printed publication. The coating may be a rosin based offset ink vehicle with about 40% loading of AOM.

Printing Press

Referring to FIG. 1, an example of a printing line 10 for printing a multi-color image upon a web 12 is illustrated. In the illustrated embodiment, four printing units 14, 16, 18, and 20 each print one color of the image upon the web 12. Each print unit 14, 16, 18, 20 includes an upper blanket cylinder 22, an upper printing plate cylinder 24, a lower blanket cylinder 26, and a lower printing plate cylinder 28. In the printing line 10, colors 1, 2, 3, and 4 on units 14, 16, 18, and 20 are typically black (K), cyan (C), magenta (M), and yellow (Y), respectively. However, it is noted that any colors of ink may be used for web-offset printing, and more or less than four print units may be used. The location of the printing units 14, 16, 18, and 20 relative to each other (e.g., the color ordering) may vary depending on user preference and/or the color scheme. In the illustrated embodiment, the printing press is a web offset press, however in other exemplary embodiments gravure, flexographic, digital presses, or other types of printing system may be used. Printing line 10 may also include a laser printing apparatus 30 that is configured to affect a color change of at least a portion of a coating printed on web 12. The color-changeable material may be on the web before it is used in the illustrated printed line 10 or a separate coating applicator, such as a print unit, may be used to apply the color-changeable material to the web. In other embodiments, the color-changeable material may be incorporated within the coating used in the print units 14, 16, 18 and/or 20. Printing line 10 may also include one or more driers to dry the ink or coating. A laser printing apparatus can be placed before or after the driers to affect a color change of either a solid or liquid coating. According to another exemplary embodiment, a laser printing apparatus can be put before or after any of printing units 14, 16, 18, and/or 20.

Depending on the coating and laser parameters, the print may be in color, have a metallic, matte, glossy, or textured finish, or be in monochrome (i.e., black or white). In one particular embodiment, the variable or fixed data may be printed by changing the color of one coating (e.g., a dark coating such as a black-colored coating) to a contrasting color. In another embodiment, the coating may include a metallic ink or other metal-containing material. In still other exemplary embodiments, the coating may include materials to provide a matte finish, a glossy finish, a texture, or a scent.

According to one exemplary embodiment, a variable data printing (VDP) operation may include a distribution location. According to another exemplary embodiment, a VDP operation may include a delivery address. According to one exemplary embodiment, a VDP operation may include pricing information. According to other exemplary embodiments, a VDP operation may include advertisements (e.g., tailored to an individual reader or recipient or a group of readers or recipients), coupons, geographic location-based information, or any other variable information.

According to one exemplary embodiment, a VDP operation may be applied directly to the surface of a printed publication. According to another exemplary embodiment, a VDP operation may apply variable data to an advertisement, for example the name on the back of an image of a jersey, or image of other clothing or clothing materials. According to other exemplary embodiments, a VDP operation may apply variable data to any item that may include variable information. According to another exemplary embodiment, a VDP operation may be applied to a label that may be affixed to a surface.

Versioning

According to another embodiment, the system may be configured to print a plurality of versions of a printed publication or packaging material. The versions may be for different geographic regions. For example, the versions may include a "metro" area version and a "suburb" area version, versions printed with different advertiser data to reflect local retailers, versions printed with different theater data to reflect local movies playing, etc. Alternatively, versions may represent any variable parameter that can be organized by variable data, such as, geographic, demographic, postal, personal, and/or book data.

According to one exemplary embodiment, versions can represent different book titles, magazine titles or magazine publishers, for example, in the case where the printing system is disposed on a printing line and/or other finishing line configured to produce two or more different titles at the same time.

The color changing techniques described herein may be used to print fixed data onto a web (or sheet) or variable data with only intermittent variation. For example, the laser may treat the printed publications based on a first set of version data to substantially complete a first print run and then switch to treating the printed publications based on a second set of version data to substantially complete a second print run. The techniques described herein can permit each print run to commence without having to stop the press run. In another example, the version data may be varied within a print run but not with each piece of printed material. This could be particularly useful when printing different versions of publications, which have runs of repeatable variable data together with fixed data. Using the laser treatment techniques described herein, the differences between versions can be printed by affecting a color change of at least a portion of the coating with a laser. This will reduce and may potentially eliminate the need for manufacturing different plates or engraving different cylinders that will be used to print each version of a publication, the make-ready time to change over the plates during a production run, and the labor, paper and energy waste associated with such make-ready and plate production. In such embodiments, the laser treatment apparatus can be located on either the printing line or a finishing line.

Saddle Stitching Line

Figure 2:
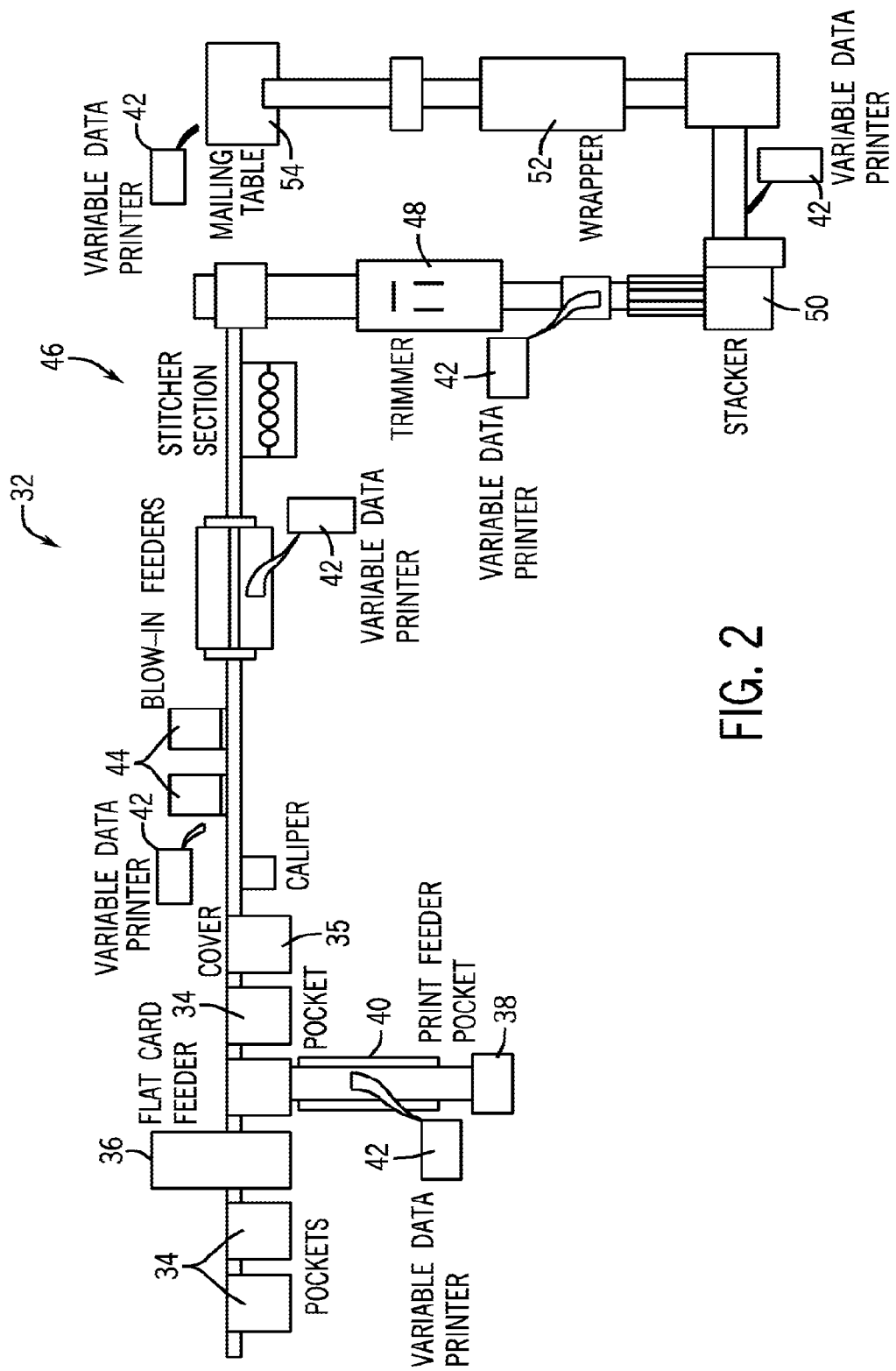
FIG. 2 is an overhead schematic view of a finishing line with a stitcher according to an exemplary embodiment.

Referring to FIG. 2, an exemplary finishing line 32 is generally configured to assemble signatures, books, blown cards, pamphlets, inserts, onserts, etc. into a finished printed material or publication and bind them with saddle stitching. Finishing line 32 may include at least one pocket 34, a flat card feeder 36, a printer feeder pocket 38, a printer feeder 40, at least one laser printing apparatus (e.g., for printing variable and/or fixed data) 42, at least one blow-in feeder 44, a stitcher section 46, a trimmer 48, a stacker 50, a wrapper 52, and a mailing table 54. Any of the above listed elements can be removed from finishing line 32 without departing from the scope of the disclosure. Finishing line 32 is preferably a post printing line or finishing line modified to include at least one laser printing apparatus 42 (as described above). Line 32 can be utilized to bind, fold, batch, collate, gather, mail and/or distribute product. The elements of line 32 may be rearranged in any of a variety of configurations.

Pockets 34 can be associated with fixed and/or variable data printing via a color changeable coating or can receive pre-printed sheets or pages that may be referred to as signatures or forms. Each signature is folded over a moving wire, chain, or bar (i.e., a saddle) and thus the printed material travels from pocket to pocket in finishing line 32 as it is assembled. At each pocket 34, a page can be combined with other sheets (i.e., signatures) to form a pamphlet or book. The last pocket is typically a cover pocket 35 where the cover is placed over the other signatures of the printed material. Alternatively, line 32 can be configured to provide a single page product or a folder type product.

A flat card feeder 36 may insert a flat card into a pocket 34 for inclusion with the print medium. Flat card feeder 36 may include printed materials with fixed and/or variable data, for example printed by changing the color of a coating.

Printer feeder pocket 38 is generally configured to feed a signature to a pocket 34 via pocket feeder 40 (e.g., a conveyor). A laser printing apparatus 42 (as described above) may be coupled to pocket feeder 40 to change the color of a coating (e.g., ink, varnish, etc.) off of the signature substrate (e.g., paper) to print fixed and/or variable data (e.g., a graphical image, text, etc.) either on the top or outside face of the signature or on the under or interior side of the saddled signature.

It is noted that although FIG. 2 may illustrate laser printing apparatus 42 to be in specific positions, in other exemplary embodiments the laser printing apparatus 42 may be at any position in a printing or finishing line 32 where variable or fixed data may be applied to a printed material. For example, laser printing apparatus 42 may be placed before trimmer 48 in the finishing area (e.g., an area to staple, bind, cover, label, etc.) according to one exemplary embodiment. In other exemplary embodiments, laser printing apparatus 42 may be mounted on trimmer 48, in printer feeder pocket 38, at a blow in feeder 44, on a trimmed medium, at a flat card feeder 36, near a stacker 50, near a wrapper 52, etc. In another exemplary embodiment, laser printing apparatus 42 may be remote from a printing or finishing line 32. In still another exemplary embodiment, laser printing apparatus 42 may be portable and placed anywhere in a printing or finishing line 32 or external to a printing or finishing line 32. Laser printing apparatus 42 may be placed within a binder to print on the inside of a signature as it passes through line 32.

Blown card feeder 44 and a laser printing apparatus 42 may be configured to print data (e.g., an advertisement) on a card that is forcefully blown (i.e., by air or another gas) into a stack of signatures. Laser printing apparatus 42 may be configured to print variable data (e.g., customized advertisements, address information, etc.) to the card. Once variable data has been printed, the card may be blown into the printed material. It is noted that while blown card feeder 44 and a laser printing apparatus 42 are illustrated as being before stitcher section 46 in finishing line 32, in other embodiments, blown card feeder 44 and laser printing apparatus 42 may be placed at other points in finishing line 32, for example after stitcher 46 or in a finishing line after trimmer 48, or may be omitted.

Stitcher section 46 is typically configured to stitch the assembled and collated printed materials received at each pocket 34 and cover pocket 35. According to various exemplary embodiments, stitcher section 46 may join the printed medium using a fastener (e.g., stitches, wire staples, etc.) or any other suitable technique.

Trimmer 48 is configured to trim to book to its desired trim size (e.g., 8½"×11") and remove any excess material as received from stitcher 46. Trimmer 48 may include one or more cutting apparatuses or be of any other design suitable for removal of excess material from the printed material.

Stacker 28 is configured to stack or gather printed materials from trimmer 48 in preparation for bundling or wrapping. Wrapper 52 then wraps or bundles the stacked printed materials for mailing or delivery. It is noted that a strapper may be present after stacker 50 and/or after wrapper 52 to strap stacks of printed material together, for example with a nylon strap or cord.

Binding Line

Figure 3:
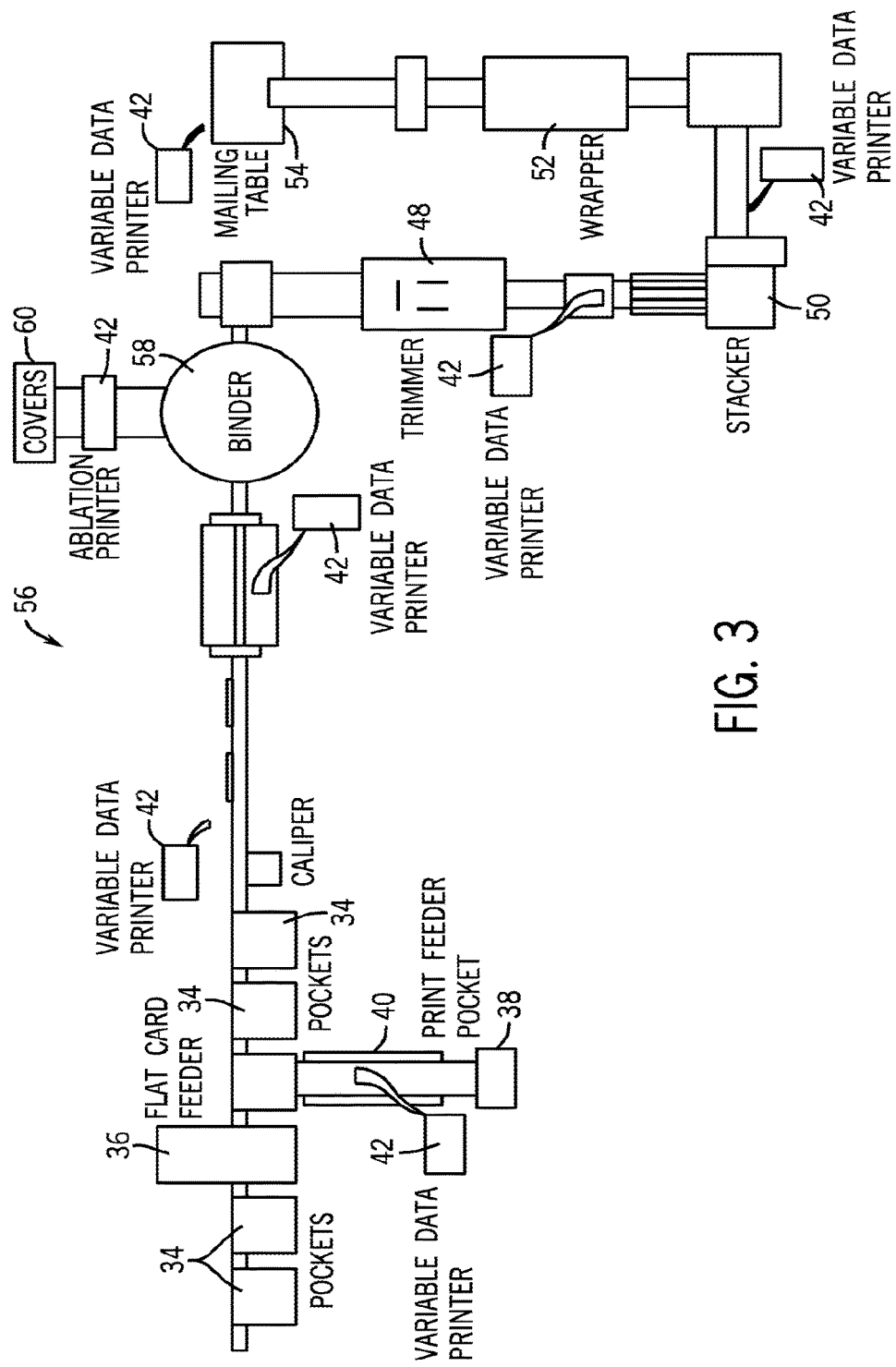
FIG. 3 is an overhead schematic view of a finishing line with a binder according to an exemplary embodiment.

Referring to FIG. 3, an exemplary finishing line 56 is generally configured to assemble signatures, books, pamphlets, inserts, onserts, etc. into a finished printed material or publication and bind them with a "perfect binding" technique that binds the signatures together with adhesive. Finishing line 56 of FIG. 3 is similar to finishing line 32 of FIG. 2 except for the manner of travel down the line and that line 56 uses a binder 58 instead of stitcher section 46 to attach the pages and cover together. The elements of line 56 may be rearranged in any of a variety of configurations.

The signatures are fed into pockets 34 by printer feeder pocket 38 via printer feeder 40 as before, however each signature is stacked on top of one another substantially flat on a conveyer line, chain, or gatherer instead of being saddled. The last pocket 34 does not receive the cover as it does in line 32. A set of covers 60 are separately fed into binder 58 for binding to the signatures. The conveyor leading to binder 58 rotates and thus rotates the signatures into a generally vertical axis where they are clamped by binder 58. The clamped signatures are rotated around a carousel and the end to be bound is dipped in an adhesive such as glue. At this point, the cover is pressed against the adhesive covered end to bind the printed material, which then travels along an extended drying line to allow the adhesive to dry. The printed material is then sent to trimmer 48 and the process continues as in finishing line 32.

It is noted that according to various exemplary embodiments, laser printing apparatus 42 may be present in one or more of the same locations in finishing line 56 as in finishing line 32 including before or after binder 58 rather than before or after stitcher section 46. Additionally, a laser printing apparatus 42 may be located on the conveyor that leads covers 60 to binder 58 for printing of fixed and/or variable data into the outside of the cover, for example with a book title or a personalized message.

Polywrap Line

Figure 14:
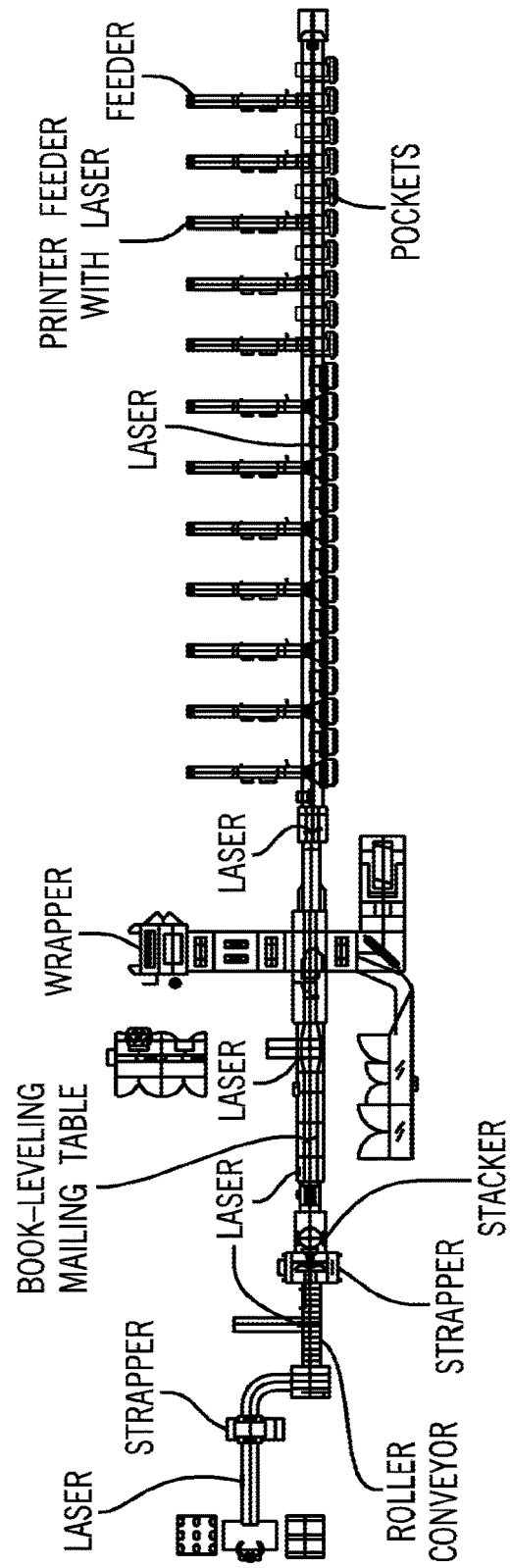
FIG. 14 is an overhead schematic view of a finishing line according to another exemplary embodiment.

Referring to FIG. 14, an exemplary finishing line is generally configured to assemble signatures, books, pamphlets, inserts, onserts, etc. into a finished printed material or publication and wrap, stack and strap them similar to the lines of FIGS. 2 and 3. The finishing line is similar to the finishing lines of FIGS. 2 and 3 except that the stitcher or binder are omitted and the wrapper wraps the unbound or unstitched finished printed material. The wrapper is configured to wrap the signatures with a poly wrap (e.g., plastic) and/or a paper wrapping. The elements of the finishing line may be rearranged in any of a variety of configurations not illustrated in the figure. For example, the laser printers illustrated in the figure may exist in other or additional locations on the line, for example between each pocket, as described above to change the color of a portion of a coating.

Mailing Line

Figure 4:
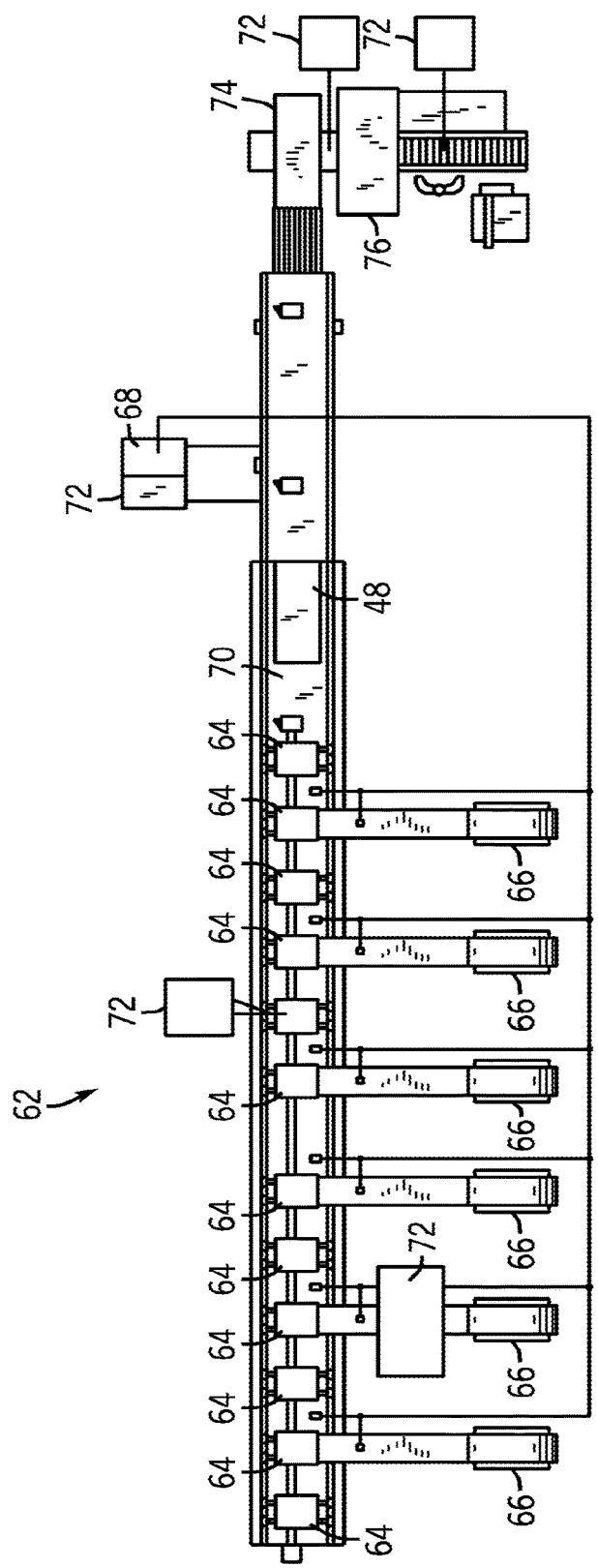
FIG. 4 is an overhead schematic view of a mailing line according to an exemplary embodiment.

Referring to FIG. 4, a mailing or co-mailing line 62 that may receive the finished printed materials from the finishing lines of FIG. 2 or 3 is illustrated. Mailing line 62 is configured to combine the finished printed materials (e.g., pre-personalized books with variable data, books with only fixed data, etc.) described above and illustrated in FIGS. 2 and 3, with other finished materials, for example to generate bundles of materials with like zip codes, carrier routes, recipient or destination addresses, or other postal information. Mailing line 62 includes one or more pockets 64. Some of the pockets or pockets 64 may be coupled to stacks or bundles of similar finished materials (e.g., all of one book title) in a pocket feeder 66. The finished materials may be bundled in postal code order. The elements of line 62 may be rearranged in any of a variety of configurations.

The mailing lists associated with the different publications in pocket feeders 66 may be merged to create a master mailing list that includes the desired postal code mailing sequence of the finished materials. The master mailing list may be maintained in a controller 68. Pocket feeders 66 are selectively actuated by controller 68 based on the master mailing list. Pocket feeders 66 selectively feed books onto a conveyor 70 in the desired postal code order.

A laser printing apparatus 72 downstream of pockets 64 also operates under the control of controller. Laser printing apparatus 72 may print fixed or variable data (e.g., addresses, postal code, destination, another identifier, a personalized message, an advertisement, etc.) on the finished materials. The finished materials are then directed to a stacker 74 and a wrapper 76 that bundle the materials together for mailing according to the postal codes. It is noted that a strapper may be present after stacker 74 and/or after wrapper 76 to strap stacks of printed material together, for example with a nylon strap or cord.

A laser printing apparatus 72 may print fixed and/or variable data to the stacked materials after stacker 74, for example to mark each book on the stack with the destination. Laser printing apparatus 72 may print fixed and/or variable data to the wrapped materials after wrapper 76, for example to mark each wrapped bundle of books with a single postal code or destination.

Using the methods and designs disclosed herein, variable data can be printed to a medium in lines 32, 56, or 62 before and during an offline or online finishing process. In one example, fixed data can be printed to a medium, for example an article in a magazine or product information on a blown card. Variable data can then be printed on the medium, for example by changing the color of a coating. The variable data may include addresses, pictures, coupons, any other type of variable data, or any combination thereof. Variable data may be printed on the print medium during the offline or online finishing process.

Packaging Line

Figure 16:
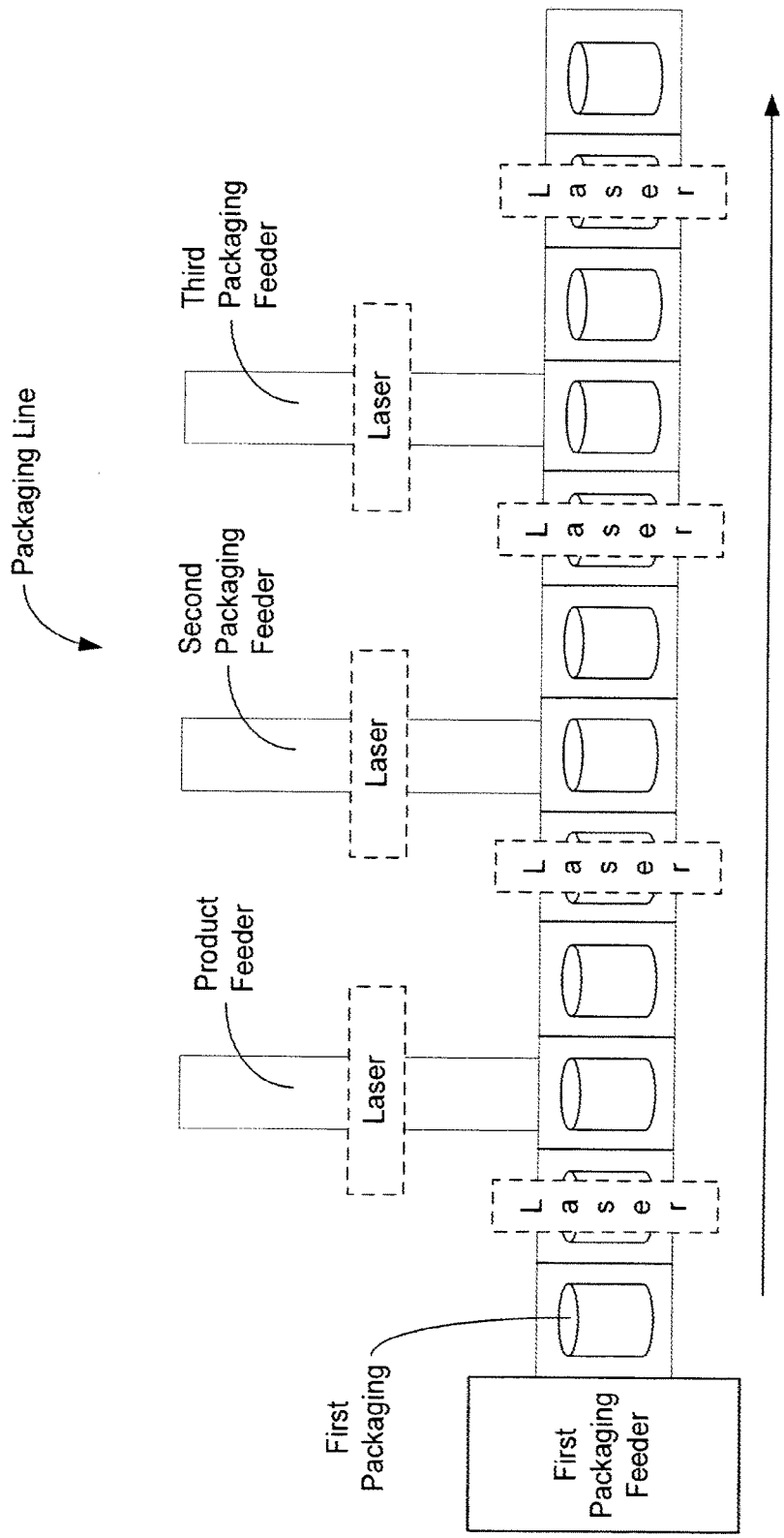
FIG. 16 is an overhead schematic view of a packaging line according to an exemplary embodiment.

Referring to FIG. 16, a packaging line is illustrated that may be configured to package a product. The packaging line is configured to package or place packaging on or around a product, for example to display, ship, or preserve the product. The packaging line may include one or more pockets. Some of the pockets may be coupled to stacks or bundles of discrete packaging units (e.g., primary, secondary, and/or tertiary packaging units) in a packaging pocket feeder. One or more of the pockets may be coupled to a product pocket feeder for inserting a product into a packaging unit. Alternatively, the product feeder may insert a product into a pocket of a conveyor with the packaging units placed on or around the product. The elements of the packaging line may be rearranged in any of a variety of configurations.

The packaging and products associated with the pocket feeders may be compiled in a list that includes the desired sequence of the packaged products. The list may be maintained in a controller (e.g., control circuit 503). The pocket feeders may be selectively actuated by the controller based on the list. The pocket feeders selectively feed packaging units and products onto the conveyor in the desired order.

The pocket feeders may also fasten the packaging units to the product or insert the product into the packaging unit.

A laser printing apparatus may be mounted over any one of the pockets or pockets feeders and also operates under the control of controller (e.g., control circuit 503). The laser may print fixed or variable data on the packaging units and/or products. Before, after, and/or during coupling of the packaging units to the product or to other packaging units. Variable data can be printed on the medium, for example by changing the color of a coating. The power to the energy source or laser may be reduced or removed between printing on the discrete packaging units.

The variable data may also be printed on the packaging materials using the methods and techniques disclose herein prior to being used to enclose a product. The pre-printed packaging material comprising the variable data may include a machine readable indicia or other code that can be matched to the product to be inserted.

Using the methods and designs disclosed herein, variable data can be printed to paper or other substrate packaging in lines 32, 56, or 62 before and during an offline or online process. Variable data can then be printed on the medium, for example by changing the color of a coating. The variable data may include product information, shipping information, pictures, coupons, any other type of variable data, advertising, or any combination thereof.

Variable Data Signature/Book Locations

Figure 5:
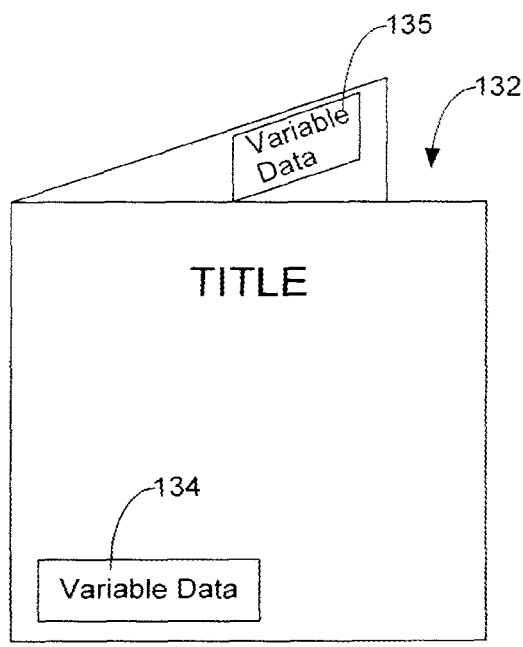
FIG. 5 is a perspective view of a printed material including variable data applied according to one exemplary embodiment.
Figure 6:
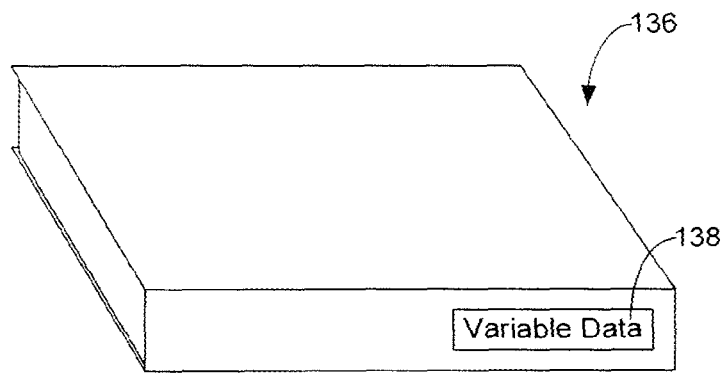
FIG. 6 is a perspective view of a printed material that includes variable data applied to the printed material spine according to one exemplary embodiment.
Figure 7:
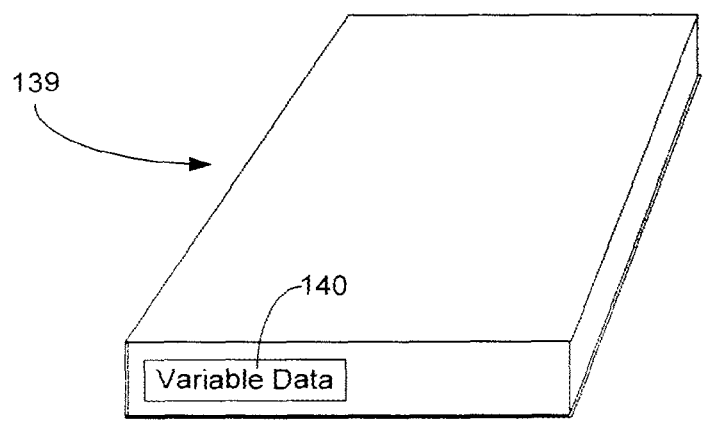
FIG. 7 is a perspective view of a printed material that includes variable data applied on the edges of the printed material pages according to one exemplary embodiment.

Referring to FIGS. 5-7, printed materials include variable data according to multiple exemplary embodiments. Referring specifically to FIG. 5, an example printed material 132 includes variable data 134 on the cover. As described above, according to various exemplary embodiments, variable data 134 may include an address, pricing information, an advertisement, etc. Additionally, printed material 132 may include variable data 135 on the underside of a page or signature of the printed material, for example if printed on a saddle-stitching finishing line. Referring specifically to FIG. 4, a printed material 136 includes variable data 138 on the spine, for example a data signifying a point of sale for a magazine. Referring specifically to FIG. 5, a printed material 139 includes variable data 140 on the edges of the pages of the printed medium, for example signifying an appropriate cover. Note that variable data 134, 138, and 140 may be of different sizes and shapes to accommodate the printed data, according to other exemplary embodiments.

Laser Configurations

Referring to FIGS. 8 and 9, laser printing apparatus 320 has a laser matrix or array configuration 344 to print variable data on a printed medium as the medium passes beneath or near the laser matrix. This configuration may allow for more variable data to be printed at a faster speed, for example using a rasterized, dot-matrix, or bitmap-style printing method. Alternatively, configuration 344 can be made of laser diodes. It is noted that while FIG. 6 shows that matrix 344 includes sixteen lasers, more or fewer than sixteen lasers may be used according to other exemplary embodiments.

Referring to FIG. 10, a laser printing apparatus 420 includes a matrix laser configuration 444 with more than one row of lasers. Laser printing apparatus 420 may operate similar to laser printing apparatus 320 with a greater printing capacity. According to various exemplary embodiments, the rows of matrix 444 may be lined up with an adjacent row or each row may be staggered. In one embodiment, matrix 444 is made up of lasers on a single head.

Referring to FIG. 11, a laser printing apparatus 620 includes multiple matrix laser configurations 344, 444, and 644. Multiple matrix configurations (with one or more columns and rows of lasers) may be used together to print at a greater printing capacity that a single matrix configuration. According to various exemplary embodiments, each matrix configuration 344, 444, and 644 may be controlled independently from one another. According to various exemplary embodiments, each matrix configuration 344, 444, and 644 may be controlled by a single control circuit.

While FIGS. 8-10 illustrate diode array or matrix laser units arranged substantially linear across the substrate and perpendicular to the direction of travel, according to other exemplary embodiments, a laser array may be arranged substantially non-perpendicular to a direction of travel of the substrate. For example, the diode array unit may be more or less than 10 degrees from perpendicular to the substrate direction of travel, more or less than 45 degrees, between about 10 and 80 degrees, or between about 25 and 65 degrees. According to various exemplary embodiments, the laser array unit may be automatically or manually moved between different angles prior to or during laser printing.

According to some exemplary embodiments, the matrix laser units may include a guard that is configured to reduce the amount of light from the laser that travels away from the printing system. According to another exemplary embodiment, the matrix laser units may include a guard that is configured to prevent light from the laser from traveling away from the printing system. According to other exemplary embodiments, the matrix laser units may omit any such guard.

Figure 12:
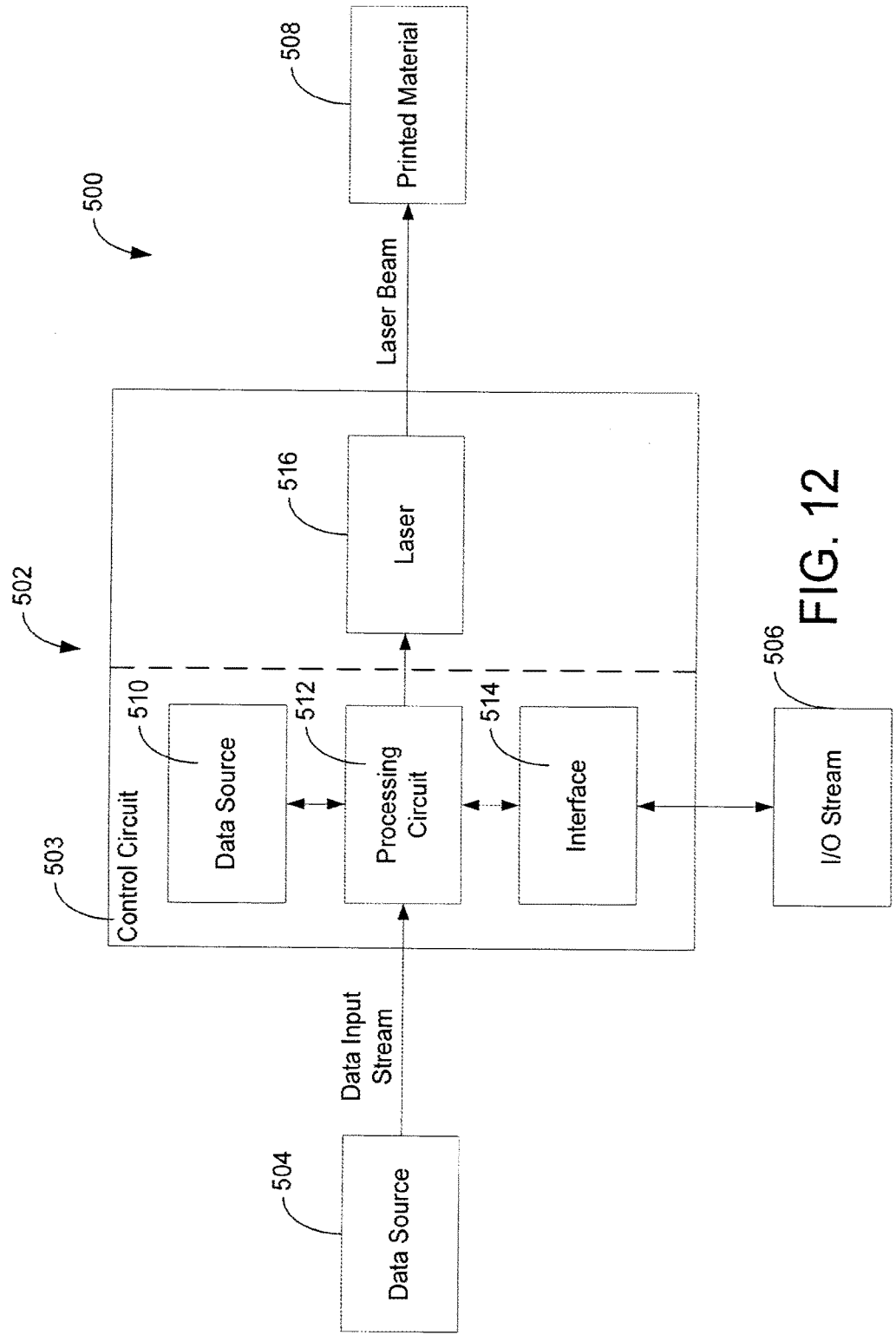
FIG. 12 is a schematic block diagram of a variable data printing system according to an exemplary embodiment.

Referring to FIG. 12, an exemplary system 500 is configured to add variable data to a printed material or publication. System 500 may include laser printing apparatus 502, a data source 504, an input/output (I/O) stream 506, and a printed material 508.

Laser printing apparatus 502 is configured to receive print data from data source 504 for output onto printed material 508 via laser treatment. Printer 502 includes a control circuit 503 and a one or more lasers 516. Control circuit 503 includes a data source 510, a processing circuit 512, and an interface 514. According to various exemplary embodiments, data source 510 may be a memory, local cache, a local hard disk drive, a CD-ROM, a floppy disk, a random access data source (e.g., a RAM), a read-only data source (e.g., a ROM), an Ethernet port, a communication port, or any other volatile or non-volatile data source capable of locally storing fixed, variable, and/or version data and transferring that data to and from processing circuit 512.

Processing circuit 512 is configured to process a fixed, variable, or version data input stream from data source 504 and/or data source 510 and output commands to laser 516 that will cause the laser to treat the print data on printed material 508. Processing circuit 512 may also receive commands from a user via interface 514 to aid in the processing of the data input stream. Alternatively, processing circuit 512 may prompt a user via interface 514 for instructions. According to various exemplary embodiments, processing circuit 512 may be any processing circuit of past, present, or future design that is capable of processing print data into commands usable by a laser for treatment of a coating. Processing circuit 512 may comprise analog and/or digital components, such as a microprocessor, microcontroller, application-specific integrated circuit (ASIC), field-programmable gate array (FPGA), or other electronic, mechanical, or electro-mechanical components, as well as any computer-readable code or software operable therewith or thereon, to perform the functions described herein and other known functions.

According to one exemplary embodiment, processing circuit 512 may be configured to receive more or less than 1 terabyte of data per second, more or less than about 0.5 terabytes of data per second, more or less than about 100 Gigabytes of data per second, or more or less than about four Gigabytes of data per second. According to another exemplary embodiment, processing circuit 512 may be configured to receive more or less than twenty Gigabytes of data per second. According to another exemplary embodiment, processing circuit 512 may be configured to receive between about one and fifty Gigabytes of data per second. According to still another exemplary embodiment, processing circuit 512 may be configured to receive between about four and twenty Gigabytes per second. According to other exemplary embodiments, processing circuit 512 may be configured to receive less than one Gigabyte of data per second.

Interface 514 is configured to provide a menu structure, algorithm, or other I/O interface that I/O stream 506 (e.g., a user, an external computer, etc.) may interact with to provide instructions or data to processing circuit 512 from the I/O stream 506 or to provide instructions or data to the I/O stream related to information about the processing circuit 512 or laser 516. Interface 514 may be any interface capable of communicating print data information between a processing circuit and an external I/O stream.

Laser 516 is configured to create print 508 by outputting a laser beam. As described above, laser 516 may be one or more of a CO2 laser, a UV laser, a YAG laser, a near-infrared laser, an infrared laser, and be packaged as a fiber laser, a laser diode, a diode array, or any other laser capable of affecting a color change of a coating on a substrate. Alternatively, any of the embodiments disclosed herein using a laser may in alternative embodiments use another energy source or electromagnetic radiation source.

Data source 504 is configured to store variable, fixed, and or version data and to send the print data in a data input stream to laser printing apparatus 502. The variable data may be based on demographic, geographic, version, or other variable data characteristics described herein. The data may comprise data for each of a plurality of different pages of a printed publication, wherein the data may be the same, different or partially the same among the different pages, and wherein the data may comprise fixed, variable and/or some fixed and some variable data for printing on each different page. According to various exemplary embodiments, data source 504 may be a memory, a hard disk drive, a CD-ROM, a floppy disk, a remote server, a random access data source (e.g., a RAM), a read-only data source (e.g., a ROM), cache, flash, Ethernet port, communication port, or any other volatile or non-volatile data source capable of storing print data. Data source 504 is configured to communicate with printer 502 using any of the communication techniques described hereinabove.

According to a number of exemplary embodiments, printed material 508 may be any substrate (e.g., paper) upon which one or more coatings of print, ink, varnish, gloss, matte finish, metallic finish, and/or other coating exist.

According to some exemplary embodiments, the system may be a USB Scanner Controller with a Flash Extension available from SCAPS GmbH of Deisenhofen, Germany, the Videojet Supply Unit from Videojet Technologies of Wood Dale, Ill., or a custom print data processing or interface system.

Figure 17:
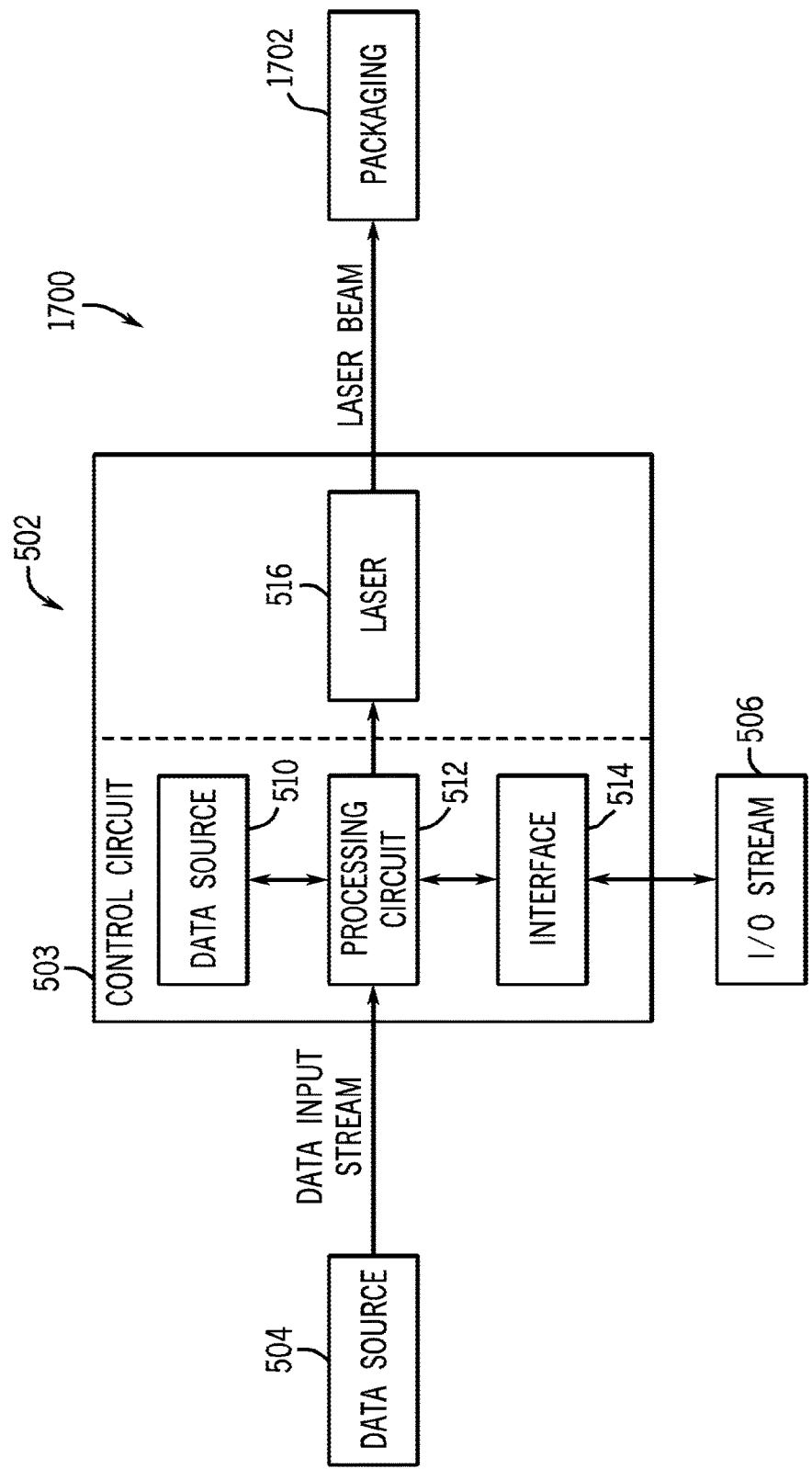
FIG. 17 is a schematic block diagram of a variable data printing system for printing on packaging according to an exemplary embodiment.

Referring to FIG. 17, an exemplary system 1700 is configured to add variable data to packaging. System 1700 may be generally similar to system 500 and include a laser printing apparatus 502, a data source 504, an input/output (I/O) stream 506, and packaging 1702. The laser printing apparatus and 502, data source 504, and I/O stream 506 may be substantially the same as in system 500, but be configured to affect a color change on packaging 1702 instead of or in addition to on a printed material or publication. Further, the power to the energy source or laser printing apparatus 502 may be controlled to be reduced or removed between printing of discrete packaging units.

Process Flow

Figure 13:
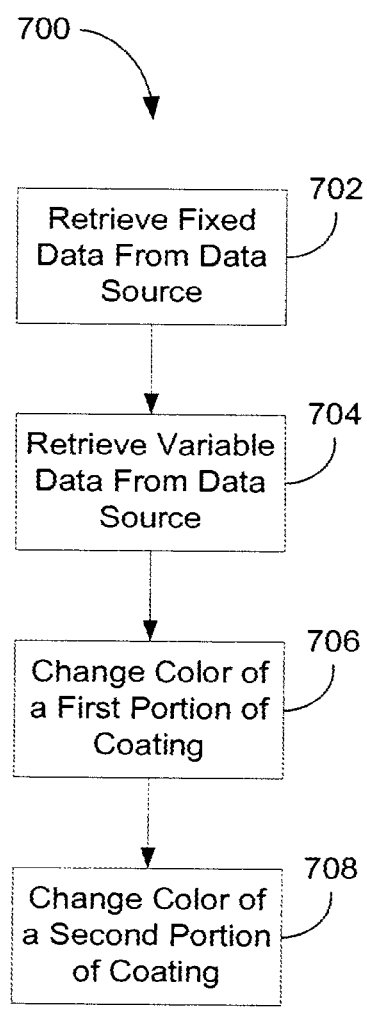
FIG. 13 is a process flow diagram of a method for printing data with the system of FIG. 10 according to an exemplary embodiment.

Referring to FIG. 13, a method 700 is configured to be executed on system 500 to perform a printing operation, for example on a printed material or publication. At a step 702, system 500 retrieves data from data source 504 or 510 that may be used to print information, including for example text characters or a graphical image. The data may be fixed data. At a step 704, system 500 retrieves data from data source 504 or 510 that can be used by system 500 to print the information, for example information that is related to content, geographic data, postal data, a personalization, or other variable data. It is noted that according to one exemplary embodiment, the first and second data may be retrieved simultaneously, either from different data sources (e.g., memories) 504 or 510 or the same data source. According to another exemplary embodiment, the first and second data may be retrieved in series, one after the other, either from different memories 504 or 510 or from the same data source. In yet another embodiment, steps 702 and 704 may be combined as a single step. At a step 706, laser 516 changes the color of a first portion of at least one coating on a substrate (e.g., a sheet of paper, a continuous web of paper, etc.) using the data. At a step 708, laser 516 changes the color of a second portion of at least a portion of the coating. The second portion may be the same or different than the first portion of the coating. According to various exemplary embodiments, any of the color changing technique described above may be used according to method 700.

Figure 18:
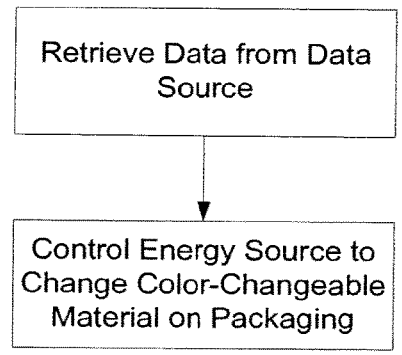
FIG. 18 is a process flow diagram of a method for printing data on packaging with the system of FIG. 17 according to an exemplary embodiment.
Figure 19:
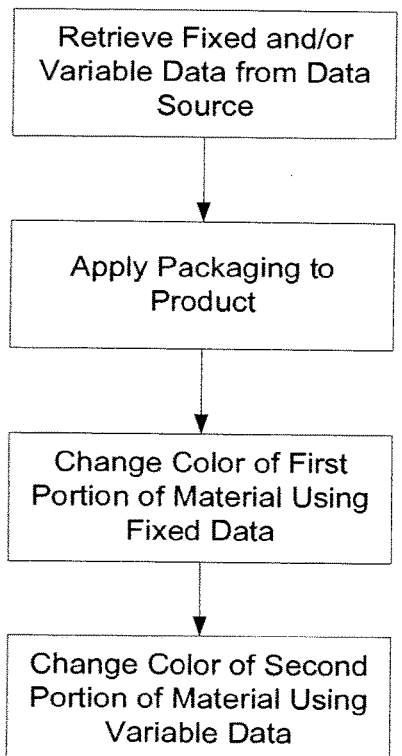
FIG. 19 is a process flow diagram of a method for printing data on packaging with the system of FIG. 17 according to another exemplary embodiment.
Figure 20:
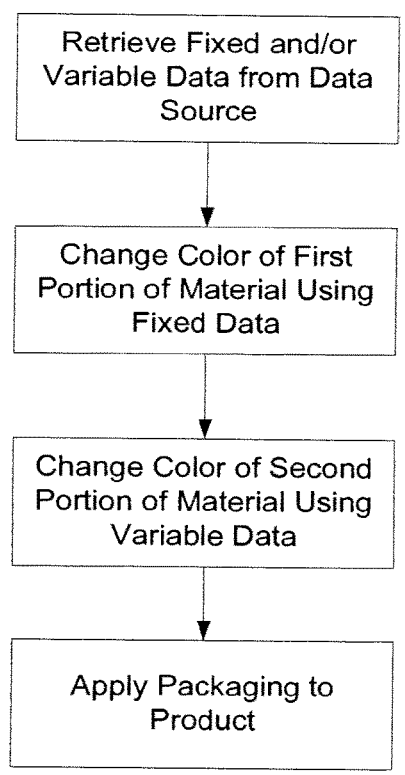
FIG. 20 is a process flow diagram of a method for printing data on packaging with the system of FIG. 17 according to another exemplary embodiment.

Referring to FIGS. 18-20, system 1700 and a packaging line may be configured to retrieve data from a data source and control the energy source, which may comprise sending the or providing the data to the energy source, to change a color-changeable material on a packaging unit according to various exemplary embodiments. System 1700 and the packaging line may retrieve fixed and/or variable data from the data source, apply packaging to a product, change the color of a first portion of the color changeable material using fixed data, and change the color of a second portion of the color-changeable material using variable data. It is noted that the packaging may be applied at any point before, after or during printing of the fixed and/or variable data according to various exemplary embodiments. In other exemplary embodiments, the color-changeable material may be changed for the printing of only fixed or only variable data. In still other exemplary embodiments, the order of the printing of fixed and variable data may be different.

Figure 21:
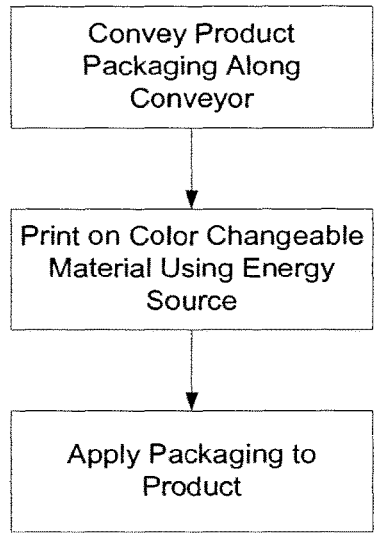
FIG. 21 is a process flow diagram of a method for printing data on packaging with the system of FIG. 17 on the packaging line of FIG. 16 according to an exemplary embodiment.
Figure 22:
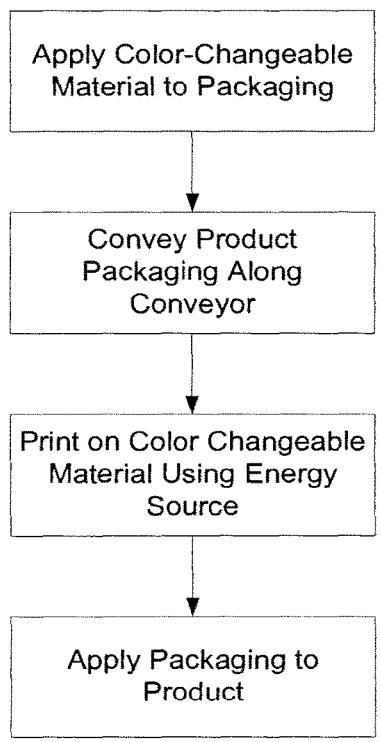
FIG. 22 is a process flow diagram of a method for printing data on packaging with the system of FIG. 17 on the packaging line of FIG. 16 according to another exemplary embodiment.
Figure 23:
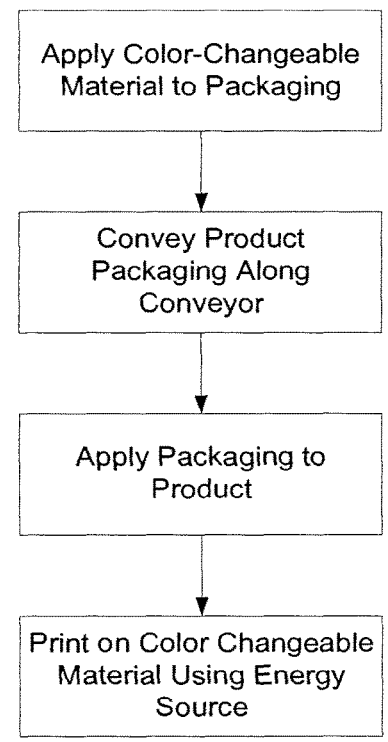
FIG. 23 is a process flow diagram of a method for printing data on packaging with the system of FIG. 17 on the packaging line of FIG. 16 according to another exemplary embodiment.

Referring to FIGS. 21-23, system 1700 and a packaging line may be configured to convey product packaging along a conveyor, print on a color-changeable material using an energy source, and apply packaging to a product according to various exemplary embodiments. System 1700 and the packaging line may apply a color-changeable material to the packaging, convey the packaging along the conveyor, print with the color-changeable material using the energy source, and apply the packaging to the product. It is noted that the packaging may be applied at any point before after or during printing of the fixed and/or variable data according to various exemplary embodiments. In other exemplary embodiments, the color-changeable material may be applied offline during or after a package manufacturing process. It is noted that the product and/or packaging may be conveyed on the conveyor substantially continuously during printing and/or packaging.

Printing with Color-Changeable Material

According to one exemplary embodiment, a web offset, gravure, or other printing press may be replaced, in whole or in part, by a printing system using one or more color-changeable materials.

An energy source (e.g., a light source such as a laser, or other energy source, which may be a laser diode array, other matrix laser head, etc.) is provided which is capable of providing energy to areas spanning substantially an entire sheet of a substrate (e.g., packaging, a sheet, a continuous web, etc. which may be paper, other materials, etc.) or substantially an entire printing area of the substrate (e.g., which may be less than about 95% of a width of the substrate, less than about 80%, less than about 50%, less than about 25%). In exemplary embodiments, the width of the printing areas may be about 1 inch, about 2 inches, about 4 inches, about 8 inches, or increments thereof. The energy source may comprise a plurality of laser diodes (e.g., a laser diode array), one or more laser heads (e.g., at least two, at least four, at least ten, at least 25, etc.), etc. The energy source may be mounted to a single housing or to a plurality of separate housings (e.g., at least two housings, at least four housings, etc., coupled together by one or more of a communication network, a power source, a cooling unit, etc.) extending from a first edge of the substrate or printing area of the substrate to a second edge of the substrate or printing area of the substrate. The housings may be movable or in a fixed, stationary, or non-moving configuration. In one exemplary embodiment, a single housing comprises a plurality of laser diodes spanning an entire predetermined printing area on a substrate.

The energy source, under control of a processing circuit, may be configured to create print with a color-changeable material coated upon or integrated within the substrate. The print may result in a resolution of at least about 600 dpi, at least about 720 dpi, or between about 600 and 720 dpi at about 1000 feet/min or more. Other embodiments may include a resolution of between about 75 dpi and 3000 dpi at speeds of between about 0 and 4000 ft/min. In one embodiment, one laser diode may be used per pixel to be printed across the width of the substrate. In other embodiments, a plurality of rows of laser diodes or a plurality of diode array units (e.g., separate housings, each having a plurality of rows of laser diodes) may be used. In still other embodiments, a plurality of diode array units may be positioned over the substrate at any of a variety of angles non-perpendicular to the direction of travel of the substrate, as described hereinabove.

According to some exemplary embodiments, a system can be configured to print each pixel differently on different sheets or portions of a continuous web of substrate or on discrete packaging units. In a conventional web press, a rotating blanket repeatedly transfers the same image to a web of paper to create a set of pages comprising a signature, the signatures being bound on a finishing line to create a book. Use of an energy source and color-changeable material allows a configuration in which all pages of a printed publication can be printed in series on a substrate (and optionally even personalized on one or more pages with variable data), so that an entire book or a substantial portion of a book can be printed in page order. This may allow for subsequent cutting and folding in-line as opposed to the current practice of printing signatures that are later assembled and bound off-line. In some embodiments, such a printing configuration may reduce the cost, complexity, time lost, defects, and/or environmental impact associated with manufacturing plates, using blankets, consuming inks, drying the web, stacking signatures into logs, storing logs, transporting logs to a finishing line, etc. Defects such as hickeys, cracks, and other defects can be eliminated by using an energy source and color-changeable material in one or more of the embodiments described herein.

As described above, the color-changeable material or materials may be applied during paper or packaging manufacturing or at a printing or packaging entity.

In one embodiment, a printing or packaging system comprises an energy source and at least one printing unit. Each of the at least one printing units may be configured to print with a web offset, gravure, or other offset or inkjet printing process, or with an energy source, such as a laser diode array. For example, offset print units may be configured to print predetermined colors on press (e.g., black, cyan, magenta, etc.) while laser print units may be configured to print other colors to the already-printed substrate to arrive at a printed publication having a large range of colors. Further, any number of color-changeable material applicators may be provided, including zero, before, in between, or after the printing units, wherein at least one printing unit may be a color-changeable material applicator. Each printing unit may be configured to print one color, an array of colors, or shades of one color. The printing units may be configured to give a viewer an impression of color and tones, for example by printing halftone dots or other markings having different tones, gray-scales, dot size, density, dot gain, trapping, changing the size of dots to be printed, changing the shade of the colors marked (e.g., from very light blue to very dark blue), etc. In the case where the printing unit is a laser printing unit, different fluence levels, frequencies, intensities, or other parameters may be used to create different colors from the color-changeable material. The printing units may be configured to print a combination of colors which can, in combination, represent a large range of acceptable colors, such as is done with CMYK, RGB, RBY, RBYG, or other color combinations. If a wet coating is applied in-line, a drier or drying step may be disposed between a color-changeable coating application step and a laser printing step, or the coating may be marked by a laser without complete drying.

Depending on coating chemistry and laser diodes, multiple arrays may be utilized (e.g., UV array followed by IR followed by UV) to achieve multicolor or full color printing. In addition, a UV blocker or UV filtering material could be applied to increase the life of the printed publication. A UV blocker can be applied to the substrate before or after marking occurs. The UV blocker may be configured to reduce or substantially prevent further color-change of the portion of the coating that was not originally changed.

According to some embodiments, printing with an energy source with a color-changeable material may be done before, after, or in between other known printing operations (e.g., web offset printing, gravure printing, ink jet printing, etc.), wherein the energy source printing may be done on the same portion (e.g., with different colors or different types of data) or a different portion of a page or image being printed.

In an alternative embodiment, a laser printing unit may be disposed on a packaging line, on a finishing line, or on a printing line after the different-colored print unit to print a cover of a printed publication, or a portion thereof (e.g., an address block on a cover).

In another alternative embodiment, a laser printing unit may be disposed on a finishing or packaging line to print fixed or variable data at between about 300 and about 600 dpi at about 350-about 500 ft/min.

Figure 15:
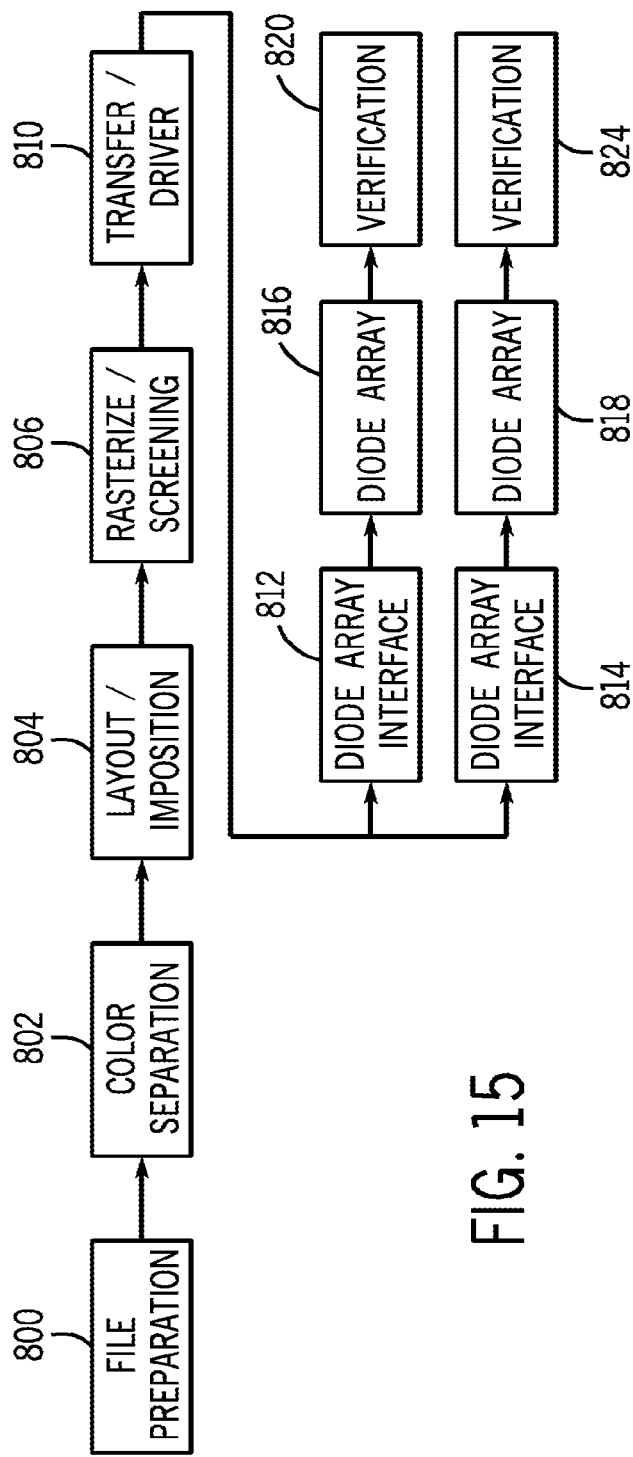
FIG. 15 is a block diagram of a process flow for laser printing, according to an exemplary embodiment.

FIG. 15 is a block diagram of an exemplary process flow for printing with a laser printing apparatus, according to an exemplary embodiment. At block 800, an image file is prepared for printing. At block 802, the image data is separated into a plurality of colors to be printed by different print units or print operations. At block 804, the order of pages to be printed on a substrate is determined. Imposition is the process of arranging pages correctly prior to printing so that they fold in the correct order. At block 806, the image data for is rasterized to create a database of data from which the energy source will determine where on the color-changeable material of the substrate to print, with which intensity and other laser settings, etc. At block 810, the data from the database is transmitted to one or a plurality of energy source interfaces, such as diode array interfaces 812, 814. Interfaces 812, 814 are configured to drive energy sources, such as diode arrays 816, 818 to print upon the color-changeable material based on the data from the database. Verification blocks 820, 824 represent steps to check color correctness, defect detection, registration error, and other verification processes, which may provide feedback to the energy sources which may adjust the energy being provided. One or more of the blocks in FIG. 15 may be implemented by a suitable processing circuit, which may comprises analog and/or digital components, such as one or more microprocessors, microcontrollers, embedded processors, application-specific integrated circuits, field-programmable gate arrays (or other programmable logic), memory, etc., configured with computer-readable instructions, code, or software to perform one or more of the functions described in any of the embodiments herein.

Additional Embodiments

According to one exemplary embodiment, provided is a system for printing data on a flexible substrate comprising a color-changeable material. The system comprises a data source, a processing circuit, and an energy source. The data source may be configured to provide data to be printed on the flexible substrate. The processing circuit may be configured to retrieve the data from the data source and to control the energy source to change a color of the color-changeable material of the flexible substrate based on the retrieved data to provide at least a portion of a printed publication.

According to another exemplary embodiment, provided is a system for printing on a substrate having a coating to provide a printed publication. The system comprises a data source, a processing circuit, and an energy source. The energy source may comprise a laser, electron beam, x-ray source, or other energy source. The data source may be configured to provide data for a plurality of different pages of a printed publication to be printed on the substrate. The processing circuit may be configured to retrieve the data from the data source and to control the laser or energy source to change the color of the coating on the substrate based on the retrieved data to provide at least a portion of each of a plurality of different pages of the printed publication.

According to another exemplary embodiment, provided is a method of printing that comprises retrieving data from a data source and changing a color of a portion of at least one color-changeable material associated with a flexible substrate using the data to create at least a portion of a printed publication.

According to another exemplary embodiment, provided is a system for printing a plurality of versions of a printed publication. The system comprises a data source, a processing circuit and a laser or other energy source. The data source may be configured to provide version data for a plurality of versions of the printed publication. The processing circuit may be configured to retrieve the version data from the data source and to control the laser to change a color of a coating on the printed publications based on the version data.

According to another exemplary embodiment, disclosed is a method of providing a continuous web of paper. The method comprises providing a paper composition, applying a color-changeable material to the paper composition, and rolling the paper composition into a continuous web on a roller.

According to another exemplary embodiment, disclosed is a printed publication that is printed by providing a flexible substrate comprising a color-changeable material, retrieving data to be printed on the flexible substrate, and providing energy to the color-changeable material based on the retrieved data to change a color of the material on the flexible substrate.

According to another exemplary embodiment, provided is a method of printing data on a flexible substrate comprising a color-changeable material. The method comprises retrieving data to be printed on the flexible substrate and controlling an energy source to change a color of the color-changeable material on the flexible substrate based on the retrieved data to provide at least a portion of a printed publication.

One embodiment of the disclosure relates to a system for printing data on packaging as the packaging moves along a conveyor. The packaging comprises a color-changeable material. The system comprises a data source that may be configured to provide data to be printed on the packaging, a processing circuit, and an energy source. The processing circuit may be configured to retrieve the data from the data source and to control the energy source to print on the packaging based on the retrieved data by changing a color of the color-changeable material as the packaging moves along the conveyor.

Another embodiment of the disclosure relates to a method of printing data on packaging as the packaging moves along a conveyor. The packaging comprises a color-changeable material. The method comprises retrieving data from a data source and controlling an energy source to print on the packaging based on the retrieved data by changing a color of the color-changeable material as the packaging moves along the conveyor.

Another embodiment of the disclosure relates to a method of packaging a product. The method comprises conveying the product packaging along a conveyor. The product packaging comprises a color-changeable material. The method also comprises printing on the color-changeable material using an energy source and applying the packaging to a product to be packaged.

According to one exemplary embodiment, product packaging is printed as the packaging moves along a conveyor.

According to another exemplary embodiment, a method of providing a continuous web of paper comprises providing a paper composition, applying a color-changeable material to the paper composition, and rolling the paper composition into a continuous web. The web of paper may alternatively be any flexible substrate. The web of paper may comprise a packaging material, or a paper suitable for printing a printed publication, such as a magazine or newspaper.

According to another exemplary embodiment, a method of packaging a product comprises conveying a product packaging along a conveyor, wherein the product packaging comprises a color-changeable material, and changing the color of at least a portion of the color-changeable material using an energy source. The product packaging may the be applied to a product, such as by filling the product packaging with the product (e.g., in the case of a liquid, such as a soft drink or cleaning solution), by wrapping the product in the product packaging, by wrapping a primary product packaging with a secondary or tertiary product packaging bearing the printed color-changeable material, etc.

According to another exemplary embodiment, a printed publication or product packaging may be made, provided, or manufactured by providing a substrate comprising a color-changeable material, retrieving data to be printed on the substrate, and providing energy to the color-changeable material based on the retrieved data to change a color of the material on the substrate.

According to another exemplary embodiment, an assemblage of printed publications comprise a first printed publication having a color-changeable coating printed with a first variable data and a second printed publication having a color-changeable coating printed with a second variable data. The first and second variable data are different. Third, fourth, etc. printed publications may be printed with the first variable data or second variable data, or with third, fourth, etc. variable data from a data source. The variable data may comprise version data. The assemblage of printed publications may be sequentially printed on a printing line, may be assembled on a finishing line (e.g., by assembling books of signatures to form a complete printed publication), and may be bundled by zip code, address, or other characteristic for shipping.

According to another exemplary embodiment, any of the systems, methods, or products described herein may print on the packaging when the packaging is substantially non-flat; may print on the packaging before the packaging is applied to a product to be packaged by the packaging; may comprise a packaging application unit configured to apply the packaging to a product; may use variable data which changes for different discrete packaging units in a print run; may use a laser diode array; may use a laser diode array in which each laser diode in the laser diode array is configured to consume at least 200 milliWatts of power; may use a laser diode array in which each laser diode in the laser diode array is configured to consume at least 1 Watt of power; may use a color-changeable material comprising a diacetylene and an energy source comprises an ultraviolet or near infrared energy source; may comprise a processing circuit configured to control the energy source to change the color of the packaging as it travels at least about 1 foot per second past the energy source; may comprise a processing circuit configured to control the energy source to change the color of the packaging at a rate of between 5 and 200 characters per packaging unit; may use a color-changeable material comprising at least one of a metal, molybdenum, titanium, zinc, a polydiacetylene, a diacetylene, ammoniumoctamolybdate (AOM) or other molybdenum compound, a vanadium compound, a tungsten compound and a compound containing a transition metal; may use a processing circuit configured to control the energy source to create a plurality of colors from the material; may use a processing circuit configured to control the amount of energy provided to the material to create the plurality of colors from the material; and/or may use a processing circuit configured to control the energy source to create at least four different colors from the material.

One or more of the embodiments described herein may use a color-changeable material comprising at least two color-changeable materials configured to change to different colors when energized by the energy source; may use a laser diode array unit which spans substantially the entire printable area of the packaging; may further comprise a coating applicator configured to apply the color-changeable coating to the packaging; may comprise a processing circuit configured to control the energy source to mark the color-changeable material with a resolution of between about 600 dpi and about 720 dpi; may convey packaging in a plurality of discrete packaging units, wherein power is reduced or removed from the energy source between printing on the plurality of discrete packaging units; may print on packaging configured to be in contact with the product to be packaged; may print on packaging configured to be in contact with other packaging to be in contact with the product to be packaged; may print on packaging configured to be in contact with second packaging configured to be in contact with third packaging configured to be in contact with the product to be packaged; may print on packaging that substantially covers the product to be packaged; and/or may print based on fixed data for substantially all discrete packaging units to be printed in a print run.

One or more of the embodiments described herein may product a printed publication comprising a signature, a book, a blown card, a pamphlet, an insert or an onsert; may produce a printed publication with a graphical image wherein the processing circuit is configured to control the energy source to change the color of the graphical image based on the data, wherein the data comprises variable data; may produce a graphical image which is an advertisement within a magazine; may use an energy source which comprises a CO2 laser, a deflected laser, a laser diode array, a near infrared diode laser, and/or an ultraviolet light laser; may use a processing circuit configured to control the energy source to change the color of the flexible substrate as it travels at least about 233 feet per minute past the energy source; may use a processing circuit configured to control the energy source to change the color of the printed publication at a rate of between 5 and 200 characters per printed publication; may use an energy source disposed at a finishing line configured to bind or stitch signatures into books; may use an energy source disposed at a printing line configured to print graphical images on paper to form the printed publication; may use an energy source disposed at a co-mailing line configured to collate different printed publications for mailing; may use an energy source configured to change the color of the color-changeable material by changing an oxidization state of the material; may use an energy source configured to change the color of the color-changeable material by changing at least one of a phase of the material and an effective conjugation length of the material; may use an energy source configured to change the color of the color-changeable material by polymerizing the material; may use an energy source configured to change the color of the color-changeable material by breaking an encapsulant to release a dye in the material.

One or more of the embodiments herein may use a processing circuit configured to control the energy source to create a plurality of colors from the material; may use a processing circuit configured to control the amount of energy provided to the material to create the plurality of colors from the material; may use a processing circuit configured to control the amount of time laser light or energy source is provided to the material to control the amount of energy provided to the material; may use a processing circuit configured to control the energy source to create at least four different colors from the material; may use a color-changeable material comprising at least two or at least three different color-changeable materials configured to change to different colors when energized by the energy source; may use a processing circuit configured to mark the color-changeable materials with halftone dots, whereby an array of colors is printed; may use an energy source comprising at least one laser diode array unit, which may span substantially the entire printable area of the substrate; may comprise a coating applicator configured to apply the color-changeable coating to the flexible substrate; and/or may use a processing circuit configured to control the energy source to mark the color-changeable material with a resolution of between about 600 dpi and about 720 dpi as the substrate travels past the energy source at a rate of at least 300 feet/minute.

Other embodiments may use stored data which represents different pages of a magazine or catalog; may comprise a coating applicator system configured to apply the coating to the substrate, wherein the coating applicator system is selected from the group consisting of a sprayer, a press unit, a pad, and a flexo press; may comprise a guard configured to reduce an amount of light of the laser from traveling away from the printing system; may comprise processing circuit configured to receive between 4 and 20 Gigabytes of data per second and to control the laser based on the received data; may use a laser comprising a diode array laser unit arranged linearly across the substrate, which may further be arranged substantially non-perpendicular to a direction of travel of the substrate; may comprise a plurality of separate diode array laser units arranged across the substrate; and/or may use a processing circuit configured to control the laser to change the color of the coating as the substrate travels at least 300 feet per minute or between about 300 and about 600 feet per minute past the laser.

One or more embodiments described herein may retrieve fixed data and variable data from a data source and comprise changing a color of a first portion of at least one coating on the substrate with the laser using the fixed data and changing a color of a second portion of the at least one coating on the substrate with the laser using the variable data. The substrates may comprise paper or plastic. The first and second portions may be changed in color to provide a printed publication. The substrate may comprise a product packaging.

One or more embodiment described herein may print based on version data corresponding to geographic regions to which the printed publications will be distributed; may use a laser which changes the color of the printed publications based on a first set of version data to substantially complete a first print run and then switches to changing the color of the printed publications based on a second set of version data to substantially complete a second print run; and/or may use a printing press configured to print fixed data on the printed publications, the printing press comprising plates, wherein the plurality of versions of the printed publication are printed using the same plates but different sets of the version data.

According to one embodiment, a method of providing a continuous web of paper may comprise providing a paper composition, applying a color-changeable material to the paper composition, and rolling the paper composition into a continuous web. The color-changeable material may be applied as a coating to the paper composition, may be mixed within the paper composition, etc. The method may further comprise delivering the continuous web of paper to a printing entity.

According to another embodiment, a printed publication may be printed by providing a flexible substrate comprising a color-changeable material, retrieving data to be printed on the flexible substrate, and providing energy to the color-changeable material based on the retrieved data to change a color of the material on the flexible substrate. The printed publication may be a magazine, catalog, advertisement, or billboard. The color-changeable material may be printed with halftone dots using the energy source. The color-changeable material may be printed with a multi-color printing operation comprising at least two colors or at least three colors, which may be printed by physically separate printing units.

One or more embodiments described herein may produce a printed publication comprising a signature, a book, a blown card, a pamphlet, an insert or an onsert; may control an energy source to create a plurality of colors from the material; control an energy source to create at least four different colors from the material; and/or may mark the color-changeable material with halftone dots, whereby a large array of colors is printed.

One or more embodiments described herein for product packaging may comprise applying the packaging to a product to be packaged before the printing step or applying the packaging to a product to be packaged after the printing step. The embodiments may control an energy source to print on a plurality of discrete packaging units as the units move along a conveyor at a speed of at least 1 foot per second. The embodiments may convey the packaging at a speed of at least 1 foot per second.

While the exemplary embodiments illustrated in the Figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with Figures should not be construed as imposing on the invention any limitations that may be present in the Figures. The present invention contemplates methods, systems and program products on any machine-readable media for accomplishing its operations. The embodiments of the present invention may be implemented using an existing computer processors, or by a special purpose computer processor for an appropriate printing system, incorporated for this or another purpose or by a hardwired system.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were shown and described in order to explain the principals of the invention and its practical application to enable one skilled in the art to utilize the invention in various embodiments and with various modifications as are suited to the particular use contemplated.

What is claimed is:

1. A method for printing data on a substrate comprising a color-changeable material using a printing press, the method comprising:
   receiving data representative of an image to be printed in the color-changeable material on the substrate, the image comprising a plurality of different colors;
   controlling, using the input data, a laser diode array to illuminate the substrate to generate at least a portion of the image on the substrate using the color-changeable material, the laser diode array comprising a plurality of diodes disposed across at least a portion of the substrate, wherein controlling the laser diode array comprises:
     controlling a first parameter of light emitted by a first diode of the plurality of diodes to cause a first portion of the color-changeable material to change to a first color of the plurality of colors; and
     controlling a second parameter of light emitted by a second diode of the plurality of diodes to cause a second portion of the color-changeable material to change to a second color of the plurality of colors, wherein the first parameter and the second parameter each comprise at least one of a wavelength, a frequency, or a power of the emitted light.

2. The method of claim 1, wherein controlling the laser diode array comprises generating the image at a resolution of at least 600 dots per inch as the substrate travels past the laser diode array at a speed of at least 1000 feet per minute.

3. The method of claim 1, wherein controlling the laser diode array comprises printing variable data that changes between at least two copies of the printed publication in the color-changeable material on the substrate.

4. The method of claim 3, wherein the variable data represents different versions of the printed publication.

5. The method of claim 1, wherein the color-changeable material comprises a coating on the substrate.

6. The method of claim 1, wherein the color-changeable material is at least partially dispersed within the substrate.

7. The method of claim 1, wherein the color-changeable material is at least partially absorbed in the substrate.

8. The method of claim 1, wherein the laser diode array is disposed on one of a printing line, a finishing line, or a packaging line, and wherein controlling the laser diode array comprises changing the color of the color-changeable material at a speed substantially the same as an operating speed of the one of the printing line, the finishing line, or the packaging line on which the laser diode array is disposed.

9. The method of claim 1, wherein the printing press comprises one or more roller devices configured to deposit one or more inks onto the substrate, wherein the one or more roller devices are configured to generate a first portion of the image on the substrate, and wherein controlling the laser diode array comprises generating a second portion of the image on the substrate.

10. The method of claim 1, wherein controlling the laser diode array comprises generating a printed publication having a plurality of pages on the substrate in a page order of the printed publication.

11. A system for printing data on a substrate comprising a color-changeable material, the system comprising:
    a laser diode array comprising a plurality of diodes; and
    a processing circuit configured to:
      receive data representative of an image to be printed on the substrate, the image comprising a plurality of different colors;
      process the input data into one or more commands for controlling the plurality of diodes to generate at least a portion of the image in the color-changeable material on the substrate, the one or more commands configured to control a parameter of light emitted by each of the plurality of diodes, wherein, for each of the plurality of diodes, the color of a portion of the color-changeable material on which the light is emitted by the diode is determined based at least in part on the parameter of the light; and transmit the one or more commands to the laser diode array to generate the at least a portion of the image on the substrate.

12. The system of claim 11, wherein the parameter comprises at least one of a wavelength, a frequency, or a power of the emitted light.

13. The system of claim 11, wherein the laser diode array spans across an entire width of a printing area of the substrate.

14. The system of claim 11, wherein the laser diode array comprises a plurality of adjacent rows of diodes mounted in parallel across the at least a portion of the substrate, and wherein the laser diode array is configured to generate a printed publication at a resolution of at least 600 dots per inch as the substrate travels past the laser diode array at a speed of at least 1000 feet per minute.

15. The system of claim 11, wherein the system is implemented on a printing press comprising one or more roller devices configured to deposit one or more inks onto the substrate, wherein the one or more roller devices are configured to generate a first portion of a printed publication on the substrate and the laser diode array is configured to generate a second portion of the printed publication on the substrate.

16. A system for printing data on a substrate comprising a color-changeable material, the system comprising:

an interface configured to receive data representative of an image to be printed on the substrate, the image comprising a plurality of different colors;

a processing circuit configured to process the input data into one or more commands for controlling a plurality of diodes of a laser diode array to generate at least a portion of the image in the color-changeable material on the substrate, the one or more commands configured to control a parameter of light emitted by each of the plurality of diodes, wherein, for each of the plurality of diodes, the color of a portion of the color-changeable material on which the light is emitted by the diode is determined based at least in part on the parameter of the light; and an output interface configured to transmit the plurality of commands to the laser diode array to generate the at least a portion of the image on the substrate.

17. The system of claim 16, wherein the parameter comprises at least one of a wavelength, a frequency, or a power of the emitted light.

18. The system of claim 16, further comprising the laser diode array, wherein the laser diode array spans across an entire width of a printing area of the substrate.

19. The system of claim 16, further comprising the laser diode array, wherein the laser diode array comprises a plurality of adjacent rows of diodes mounted in parallel across the at least a portion of the substrate, and wherein the laser diode array is configured to generate a printed publication at a resolution of at least 600 dots per inch as the substrate travels past the laser diode array at a speed of at least 1000 feet per minute.

20. The system of claim 16, wherein the system is implemented on a printing press comprising one or more roller devices configured to deposit one or more inks onto the substrate, wherein the one or more roller devices are configured to generate a first portion of a printed publication on the substrate and the processing circuit is configured to generate a transmit the commands to control the laser diode array to generate a second portion of the printed publication on the substrate.

* * * * *